(12) United States Patent
Yoshioka

(10) Patent No.: US 8,351,958 B2
(45) Date of Patent: Jan. 8, 2013

(54) MOBILE DEVICE AND METHOD FOR IDENTIFYING LOCATION THEREOF

(75) Inventor: Mototaka Yoshioka, Osaka (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 12/744,789

(22) PCT Filed: Jul. 14, 2009

(86) PCT No.: PCT/JP2009/003303
§ 371 (c)(1),
(2), (4) Date: May 26, 2010

(87) PCT Pub. No.: WO2010/007765
PCT Pub. Date: Jan. 21, 2010

(65) Prior Publication Data
US 2010/0304757 A1    Dec. 2, 2010

(30) Foreign Application Priority Data

Jul. 15, 2008 (JP) .................................. 2008-184220

(51) Int. Cl.
*H04W 24/00*    (2009.01)
(52) U.S. Cl. .................................................. 455/456.1
(58) Field of Classification Search .................. 455/418, 455/550.1, 456.1
See application file for complete search history.

(56) References Cited

U.S. PATENT DOCUMENTS

| 7,394,362 | B2 | 7/2008 | Ogino et al. | |
| 7,421,286 | B1 * | 9/2008 | Sisto | 455/557 |
| 7,430,439 | B2 * | 9/2008 | Griffin et al. | 455/552.1 |
| 2002/0010008 | A1 * | 1/2002 | Bork et al. | 455/567 |

(Continued)

FOREIGN PATENT DOCUMENTS

JP    2000-268130    9/2000

(Continued)

OTHER PUBLICATIONS

International Search Report issued Oct. 20, 2009 in International (PCT) Application No. PCT/JP2009/003303.

(Continued)

*Primary Examiner* — Nathan Mitchell
(74) *Attorney, Agent, or Firm* — Wenderoth, Lind & Ponack, L.L.P.

(57) ABSTRACT

To provide a mobile device which can accurately identify a location of the mobile device in relation to a user.
The mobile device includes: an operation input unit (101) which receives an input of operation information entered by the user; a sensor unit (102) which detect speed information regarding the mobile device (100); a reference point rule holding unit (103) which holds reference point rules each of which indicates a relationship between the operation information and a reference point which indicates the location of the mobile device (100) at a point in time when the input of the operation information is received; a reference point determining unit (104) which determines, as an operation reference point, the reference point corresponding to the operation information received by the operation input unit (101), with reference to the reference point rules; a trajectory calculating unit (105) which calculates a movement trajectory of the mobile device (100), based on the speed information detected by the sensor unit (102); and a location identifying unit (106) which identifies a location of an end point of the movement trajectory originating at a start point that is a point corresponding to the operation reference point, using the movement trajectory calculated by the trajectory calculating unit (105).

16 Claims, 22 Drawing Sheets

U.S. PATENT DOCUMENTS

| | | | |
|---|---|---|---|
| 2004/0180649 A1* | 9/2004 | Vogel et al. | 455/418 |
| 2006/0028339 A1 | 2/2006 | Ogino et al. | |
| 2006/0116175 A1* | 6/2006 | Chu | 455/567 |
| 2007/0037605 A1* | 2/2007 | Logan | 455/567 |
| 2007/0075965 A1* | 4/2007 | Huppi et al. | 345/156 |
| 2008/0045207 A1* | 2/2008 | Ahn et al. | 455/428 |
| 2008/0125184 A1 | 5/2008 | Sano | |
| 2008/0132196 A1* | 6/2008 | Soh et al. | 455/404.1 |
| 2009/0312049 A1* | 12/2009 | Isomursu | 455/550.1 |
| 2010/0048256 A1* | 2/2010 | Huppi et al. | 455/574 |

FOREIGN PATENT DOCUMENTS

| | | |
|---|---|---|
| JP | 2001-144853 | 5/2001 |
| JP | 3505040 | 3/2004 |
| JP | 2006-45993 | 2/2006 |
| JP | 2007-296367 | 11/2007 |
| JP | 2008-92164 | 4/2008 |
| JP | 2010-220818 | 10/2010 |
| WO | 2005/096597 | 10/2005 |
| WO | 2006/080068 | 8/2006 |
| WO | 2007/130792 | 11/2007 |
| WO | 2007/130793 | 11/2007 |

OTHER PUBLICATIONS

Hisashi Kurasawa et al., "*User Posture and Movement Estimation Based on 3-Axis Acceleration Sensor Position on the User's Body*", IPSJ SIG Technical Report, vol. 2006, No. 54, May 23, 2006, pp. 15-22 with its partial English translation.

* cited by examiner

| Operation information | Reference point |
|---|---|
| Power button | Chest |
| Text message check button | Chest |
| Disconnect button | Chest |
| TV button | Chest |
| : | : |

FIG. 5B
(a) Check text messages near chest
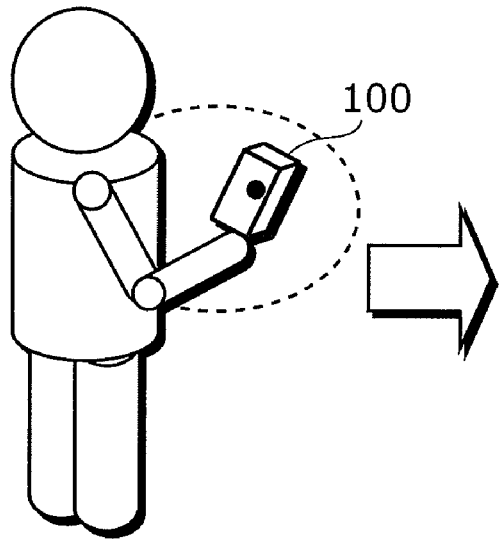
(b) House the device in trouser pocket
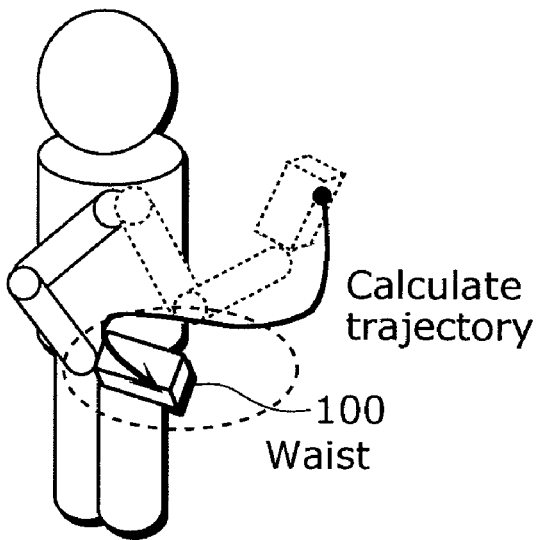
(c) House the device in chest pocket
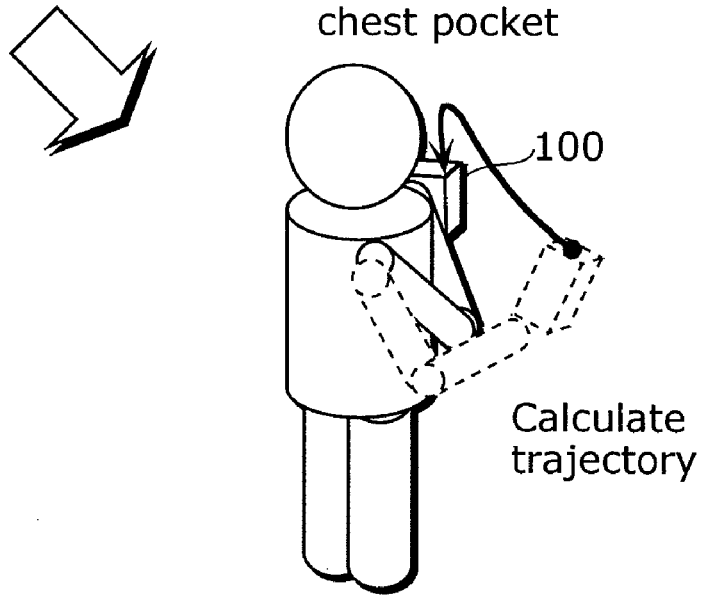

FIG. 6A
| Operation information | Reference point |
|---|---|
| Call | Ear |
| ⋮ | ⋮ |
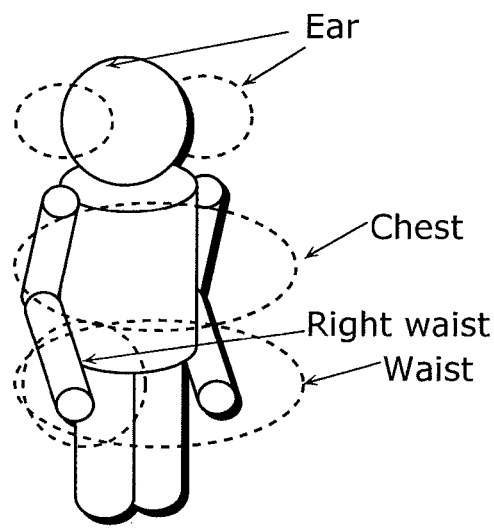
FIG. 6B
(a) Call at ear
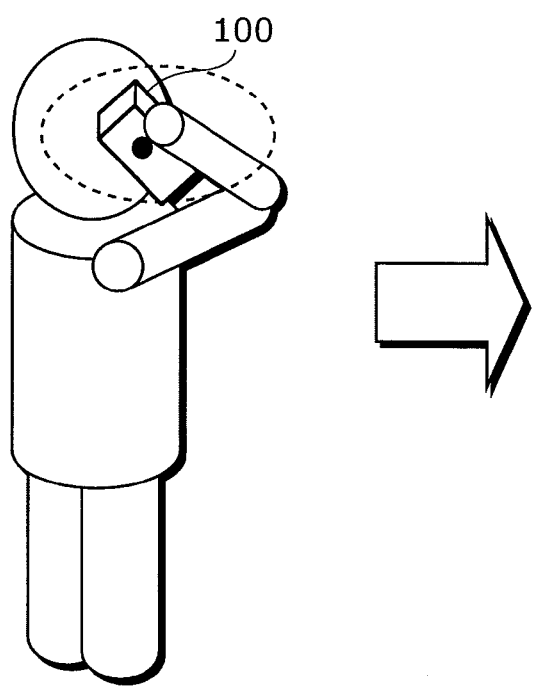
(b) House the device in trouser pocket
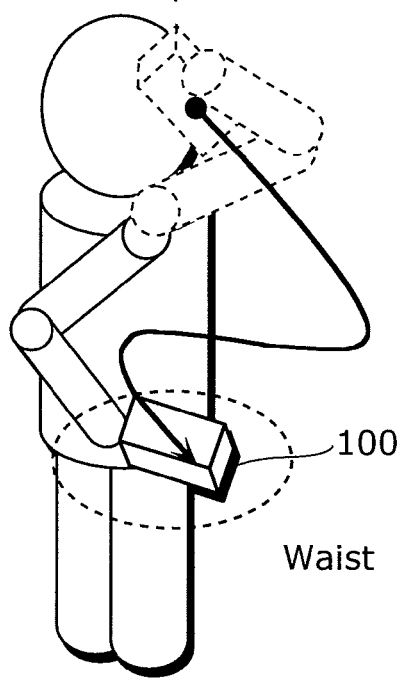

(a) Carrying Icoca and Edy (electronic money) near waist (b) House them in trouser pocket

FIG. 10

| Device location | Mode |
|---|---|
| Chest space | Vibration |
| Waist space | Sound |
| ⋮ | |

FIG. 13

| Device location | Action | Pattern |
|---|---|---|
| Waist space | Stop | 0 <= Angle < 10<br>0.5 ms <= Cycle |
| | Walking | 10 <= Angle < 15<br>0.3 ms <= Cycle < 0.5 ms |
| | Running | 15 <= Angle < 20<br>0.3 ms <= Cycle < 0.5 ms |
| | Gripping | Unable to judge |
| | .. | .. |
| Chest space | Stop | 0 <= Angle < 5<br>Cycle < 0.3 ms |
| | Walking | 5 <= Angle < 10<br>0.3 ms <= Cycle < 0.5 ms |
| | Running | 10 <= Angle < 15<br>0.3 ms <= Cycle < 0.5 ms |
| | Gripping | 15 ms or more<br>0.5 ms <= Cycle |
| | .. | .. |

FIG. 14
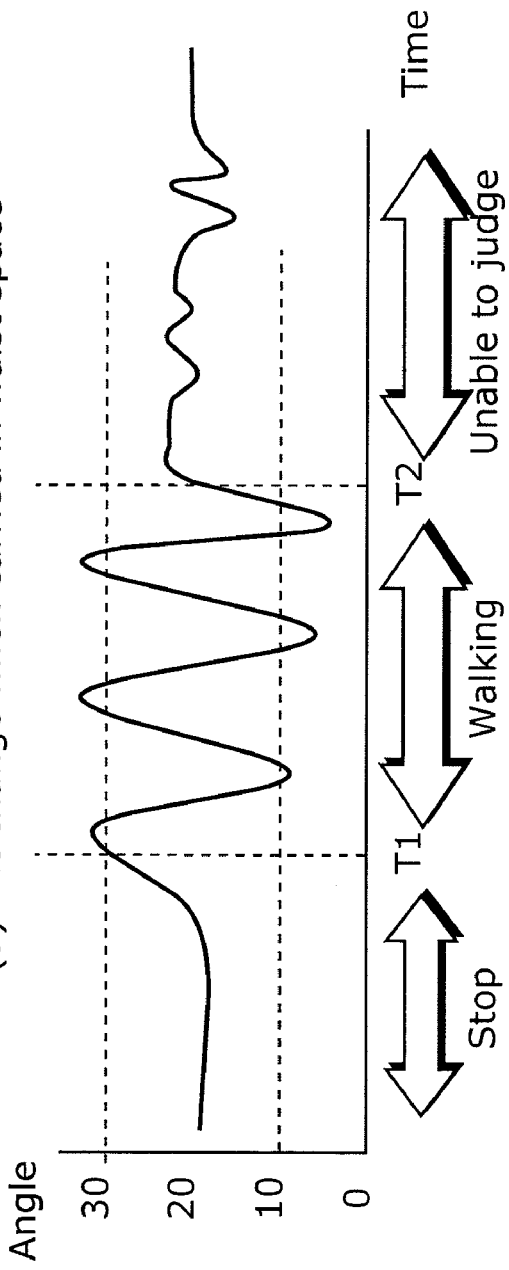
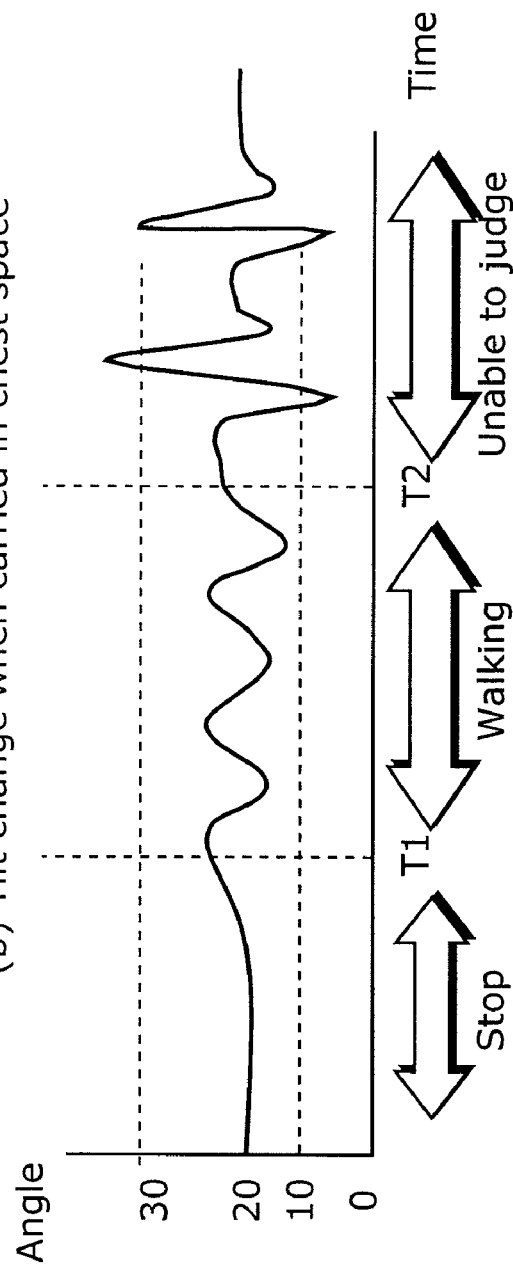

MOBILE DEVICE AND METHOD FOR IDENTIFYING LOCATION THEREOF

TECHNICAL FIELD

The present invention relates to identifying a location of a mobile device, and relates to identifying a relative location of a mobile device with respect to a user.

BACKGROUND ART

Conventionally, there is a method of judging whether the mobile device is housed in a trouser pocket or in a chest pocket, using acceleration, angle speed and angle, and so on detected by an acceleration sensor and a gyroscope that are included in the mobile device (for example, see Non Patent Literature 1). FIG. 21 is a diagram showing an example of a display screen of a system disclosed in Non Patent Literature 1.

FIG. 21 is a graph indicating a temporal change in tilt angle detected by the gyroscope included in the mobile device carried by a walking user. Since the mobile device carried by the user oscillates along with walking, it is possible to observe that an oscillation having a predetermined angle is being detected. On the other hand, in terms of oscillation level (here, angle size), it can be observed that: the oscillation is large when the mobile device is in the trouser pocket because it is significantly influenced by a foot that steps forward, while on the other hand the oscillation is small when the mobile device is in the chest pocket. Thus, the system disclosed in Non Patent Literature 1 judges where the mobile device is located, using oscillation level that varies depending on where the mobile device is located.

CITATION LIST

Non Patent Literature

[NPL 1]
"User Posture and Movement Estimation Based on 3-Axis Acceleration Sensor Position on the User's Body", Hisashi KURASAWA, Yoshihiro KAWAHARA, Hiroyuki MORIKAWA, and Tomonori AOYAMA, Information Processing Society of Japan, UBI (2006)

SUMMARY OF INVENTION

Technical Problem

However, the system disclosed in the above Non Patent Literature 1 identifies the location using only acceleration and so on, and thus errors generated by the sensor noise and differences in situations and so on have large influences and make it very difficult to accurately identify the location of the mobile device in relation to the user.

Thus, the present invention, conceived in view of the above problem, is to provide a mobile device which allows improving location accuracy in identifying the location of the mobile device in relation to the user.

Solution to Problem

To solve the above problem, a mobile device according to an aspect of the present invention is a mobile device which identifies a location of the mobile device in relation to a user, and includes: an operation input unit which receives an input of operation information entered by the user; a sensor unit which detects speed information regarding the mobile device; a reference point rule holding unit which holds reference point rules each of which indicates a relationship between the operation information and a reference point which indicates the location of the mobile device at a point in time when the input of the operation information is received; a reference point determining unit which determines, as an operation reference point, the reference point corresponding to the operation information received by the operation input unit, with reference to the reference point rules; a trajectory calculating unit which calculates a movement trajectory of the mobile device, based on the speed information detected by the sensor unit; and a location identifying unit which identifies a location of an end point of the movement trajectory originating at a start point that is a point corresponding to the operation reference point, using the movement trajectory calculated by the trajectory calculating unit.

With this, it is possible to identify the location of the mobile device, based on a movement trajectory from an operation reference point which indicates the location of the mobile device in relation to the user, thus improving the location accuracy in identifying the location of the mobile device in relation to the user.

Advantageous Effects of Invention

A mobile device according to the present invention allows improving accuracy in location identification by identifying the location of the mobile device, based on the location relationship with the user when an input operation is performed.

BRIEF DESCRIPTION OF DRAWINGS

FIG. 5B is a diagram for describing determining the operation reference point and identifying a location of the mobile device in relation to the user.

FIG. 6A is a diagram for describing a reference point rule regarding a reference point "ear".

FIG. 6B is a diagram for describing identifying the location of the mobile device in relation to the user.

FIG. 10 is a diagram showing an example of a mode rule.

FIG. 13 is a diagram showing an example of an action pattern rule stored in an action pattern rule holding unit.

FIG. 14 is a diagram for describing judging an action.

DESCRIPTION OF EMBODIMENTS

Hereinafter, a mobile device according to the present invention will be described with reference to the drawings.

Embodiment 1

Figure 1:
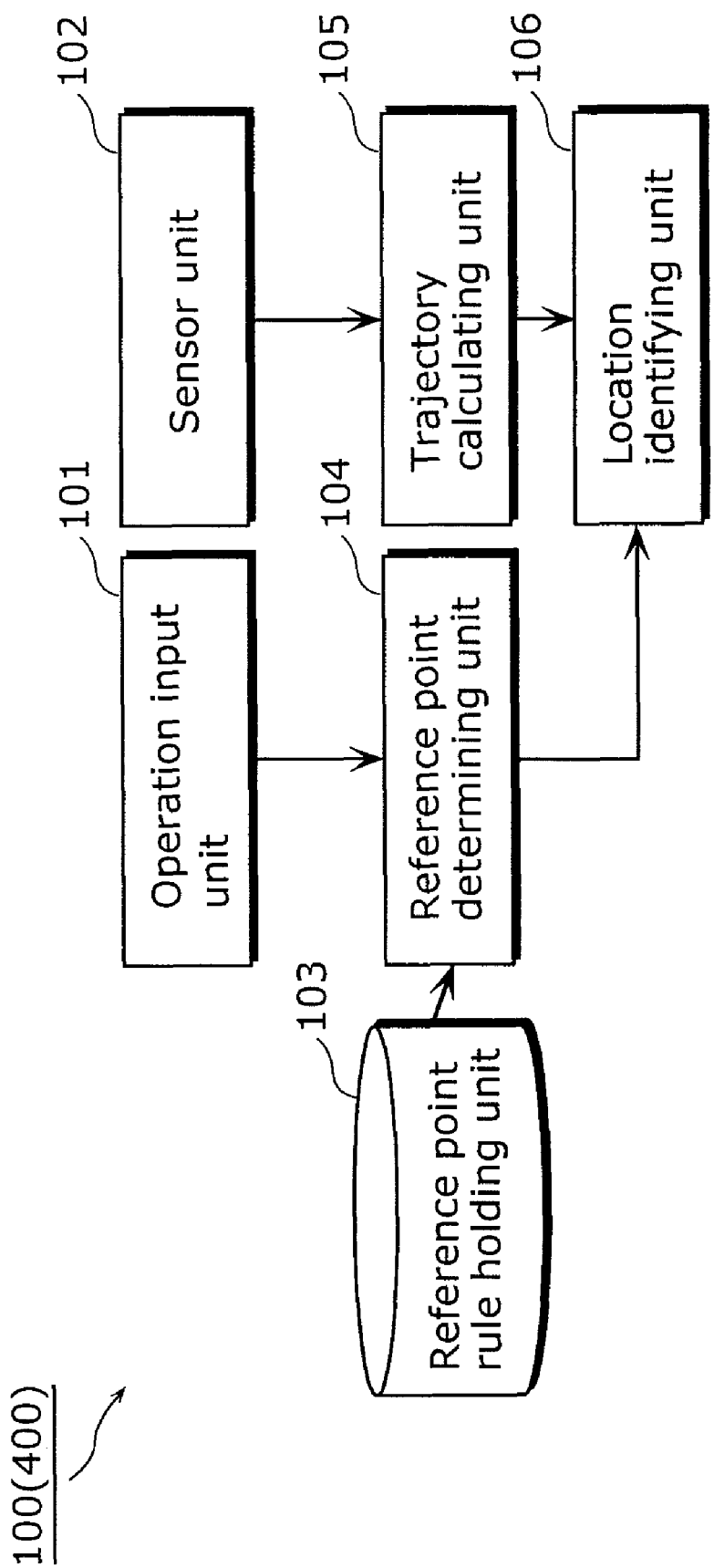
FIG. 1 is a block diagram showing a functional configuration that is characteristic of a mobile device according to a first embodiment of the present invention.

FIG. 1 is a block diagram showing a functional configuration that is characteristic of a mobile device 100 according to the present embodiment. The mobile device 100 is a device that can be portably used by the user, and is a device such as a cellular phone, a personal digital assistant (PDA), a digital still camera, and a portable audio player. As the figure shows, the mobile device 100 includes: an operation input unit 101, a sensor unit 102, a reference point rule holding unit 103, a reference point determining unit 104, a trajectory calculating unit 105, and a location identifying unit 106. Hereinafter, first, each of the constituent elements will be described, and then the operation flow of the present invention will be described.

The operation input unit 101 receives operation information inputted by the user. In recent years, numerous functions have been incorporated in the mobile device; for example, the cellular phone has various functions such as text-messaging, movie, TV, and music reproduction, to say nothing of a call function. Operation information indicates information related to the operation performed to execute these functions, and represents, for example, information indicating that a power button, a call button, a text message check button or the like is pressed, or a call.

Figure 2:
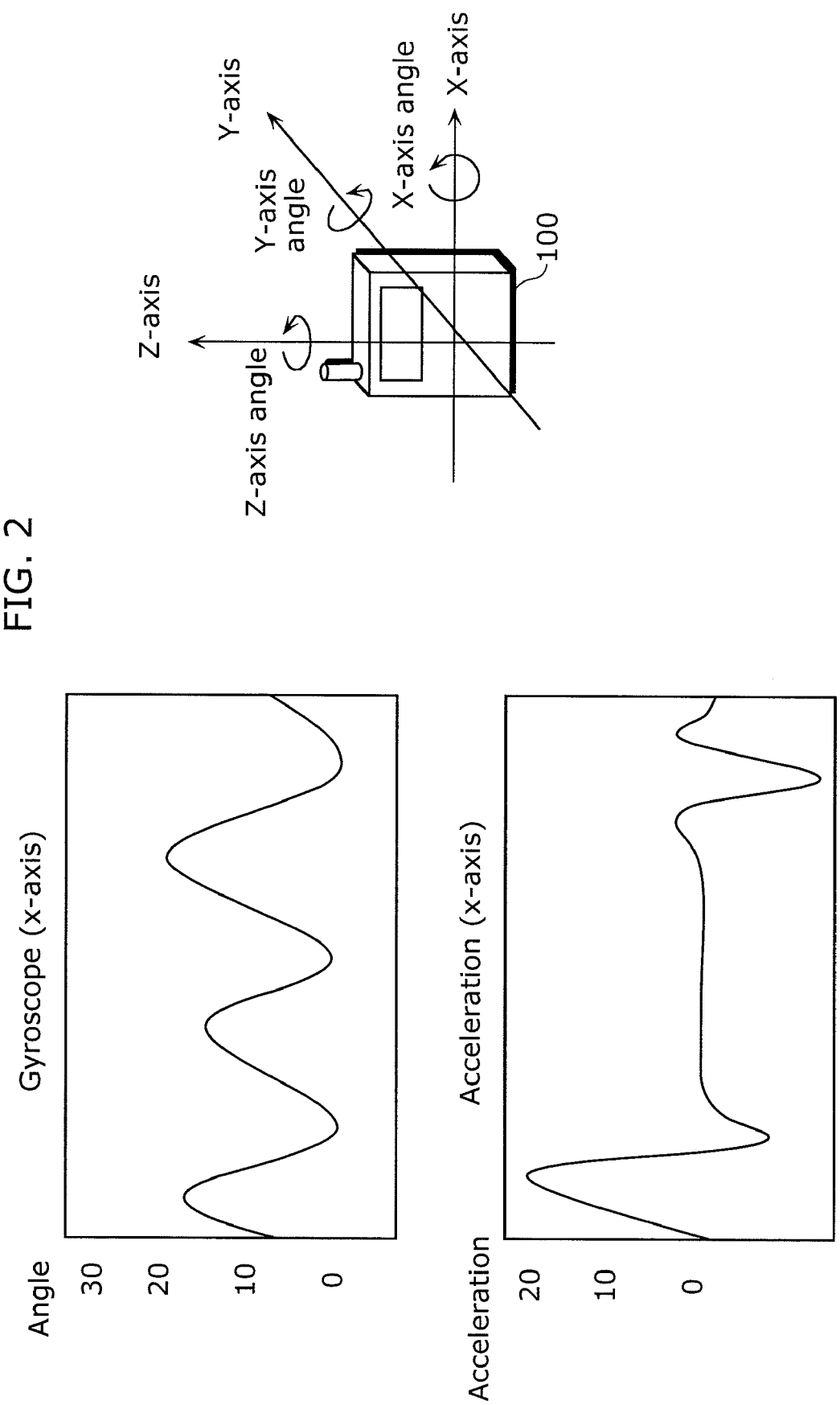
FIG. 2 is a diagram for describing a sensor unit.

The sensor unit 102 detects speed information regarding the mobile device 100. Specifically, the sensor unit 102 starts detecting speed information when the operation input unit 101 receives an input of operation information. This sensor unit 102 includes a sensor such as an acceleration sensor which detects acceleration of the mobile device 100 and a gyroscope which detects an angle speed of the mobile device 100. Note that acceleration and angle speed are examples of speed information representing the information that allows calculation of the speed of the mobile device. FIG. 2 is a diagram for describing the sensor unit 102. As the figure shows, for example, the acceleration sensor can detect triaxial acceleration of x-, y-, and z-axes. In addition, the gyroscope can detect the angle speed with respect to each of the x-, y-, z-axes.

Figure 3:
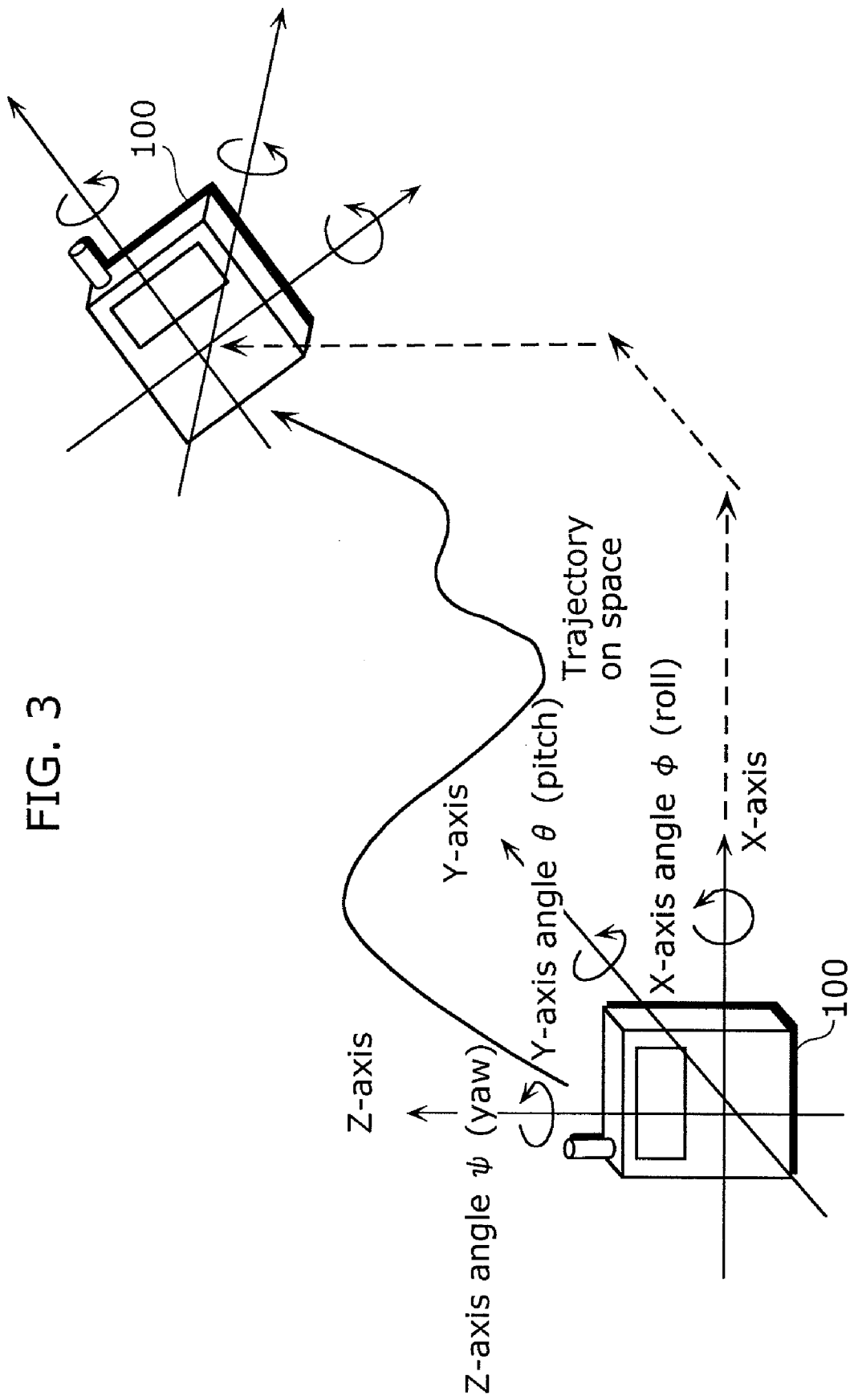
FIG. 3 is a diagram for describing calculating a movement trajectory of the mobile device performed by a trajectory calculating unit.

The trajectory calculating unit 105 calculates a movement trajectory of the mobile device 100, based on the speed information (acceleration and angle speed) detected by the sensor unit 102. FIG. 3 is a diagram for describing calculation of a movement trajectory of the mobile device 100 performed by the trajectory calculating unit 105. Conventionally, according to known methods, the movement trajectory or a displacement of the mobile device is calculated based on the value detected by the acceleration sensor and the gyroscope. The displacement of the mobile device is calculated by calculating a double integral of the acceleration detected by the acceleration sensor, and the rotation (yaw, roll, and pitch) of the mobile device with respect to each of the axes is calculated by performing integration on the angle speed detected by the gyroscope. By performing matrix operation as shown in Expressions (1) and (2) below using the calculated displacement and rotation, it is possible to calculate a movement trajectory originating at the location of the mobile device 100 at a certain point in time. Note that since the acceleration sensor and the gyroscope include a predetermined error, it is preferable to take measures for reducing the influence of the error, such as ignoring the acceleration and angle speed that are lower than a predetermined threshold.

Figure 4:
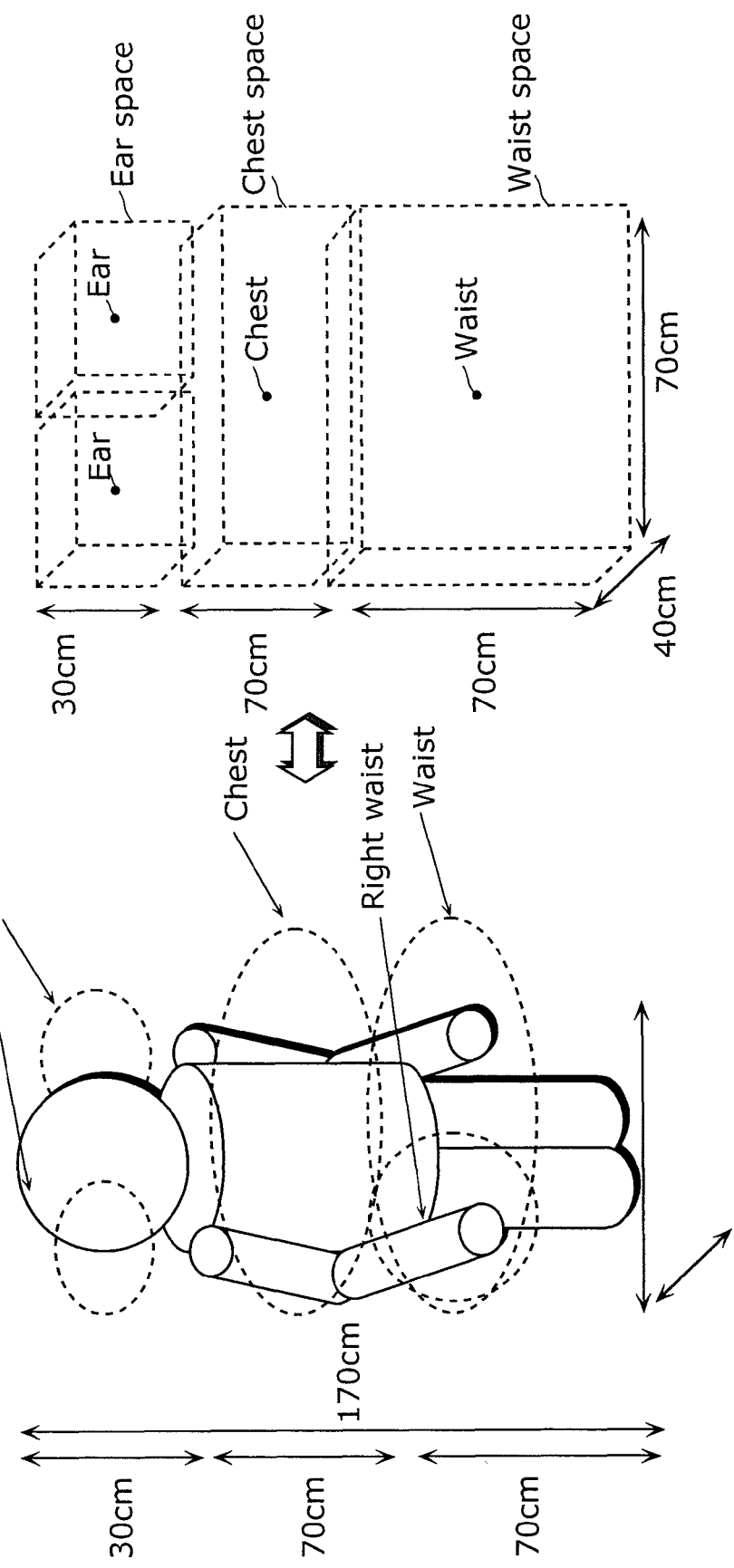
FIG. 4 is a diagram for describing a reference point and a reference space.

[Math. 1]

$$\begin{bmatrix} x \\ y \\ z \end{bmatrix} = A \begin{bmatrix} X \\ Y \\ Z \end{bmatrix} + \begin{bmatrix} Lx \\ Ly \\ Lz \end{bmatrix} \quad (1)$$

$$A = \begin{bmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\sin\psi - \sin\phi\cos\psi & \cos\phi\cos\theta \end{bmatrix} \quad (2)$$

x, y, z: position
X, Y, Z: position before moving
A: rotation matrix
Lx, Ly, Lz: displacement
ψ, φ, θ: yaw angle, roll angle, pitch angle The reference point rule holding unit 103 holds information regarding a position (hereinafter, referred to as a reference point) and a space (hereinafter, referred to as a reference space) in relation to the user. FIG. 4 is a diagram for describing the reference point and the reference space. Hereinafter, the reference point and the reference space will be described using an example of a human body model, assuming that the user is 170 cm in height. As the figure shows, considering the height and shoulder width of the human body model, a space that is 170 cm in height, 70 cm in width, and 40 cm in depth can be considered as the space close to the human body. By defining this space close to the human body, for example, in descending order of height starting from a head space (30 cm), a chest space (70 cm), a waist space (70 cm), and so on, it is possible to define the location in relation to the user, according to the position of each space. Thus, according to the present embodiment, the reference point rule holding unit holds reference spaces: an "ear space" that is an upper portion within 30 cm, a "chest space" that is a middle portion within 70 cm, and a "waist space" that is a lower portion within 70 cm. In addition, the reference point rule holding unit 103 holds "ear", "chest", and "waist", each of which is a center point in each of the reference spaces.

Figure 5A:
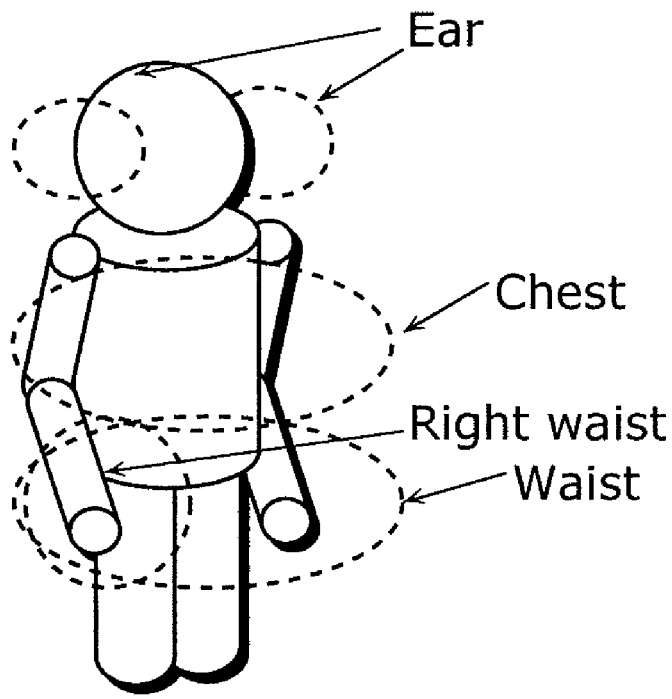
FIG. 5A is a diagram showing an example of reference point rules.

Furthermore, the reference point rule holding unit 103 holds information regarding where of the user the operation was inputted into the mobile device 100. In other words, the reference point rule holding unit 103 holds rules (hereinafter, referred to as reference point rules) each of which indicates a relationship between operation information and the reference point at which the input of the operation information is received. FIG. 5A is a diagram showing an example of the reference point rules. For example, generally, when pressing a power (ON/OFF) button of the mobile device 100 or pressing a text message check button, the user performs the operation near the chest. Thus, as the figure shows, according to the reference point rules, a reference point "chest" is set for the operation information "power button", "text message check button", and so on.

The reference point determining unit 104 determines, as an operation reference point, a reference point corresponding to operation information newly received by the operation input unit 101, by referring to the reference point rules.

FIG. 5B is a diagram for describing an example of determining the operation reference point and identifying the location of the mobile device 100 in relation to the user. In FIG. 5B(a), the user uses the mobile device 100 to check text messages. According to the reference point rules shown in FIG. 5A, since the reference point corresponding to the operation information "text message check button" is the "chest", the reference point determining unit 104 determines the operation reference point as the "chest".

The location identifying unit 106 identifies the location of the mobile device 100 in relation to the user, based on the determined operation reference point and the calculated movement trajectory calculated by the trajectory calculating unit 105. In other words, the location identifying unit 106 identifies the location of the end point, using the movement trajectory calculated by the trajectory calculating unit 105, when the point corresponding to the operation reference point is assumed to be a start point.

Hereinafter, identifying the location of the mobile device 100 in relation to the user will be described with reference to FIG. 5B. First, as shown in FIG. 5B(a), the user checks text messages, using the mobile device 100. Subsequently, as shown in FIG. 5B(b), the user houses the mobile device 100 in the trouser pocket. On the other hand, the trajectory calculating unit 105 calculates the movement trajectory of the mobile device 100, based on the speed information detected by the sensor unit 102, during a period from when the user checks text messages to when the user houses the mobile device 100 in the pocket. Then, the location identifying unit 106 identifies the location of the end point of the movement trajectory calculated by the trajectory calculating unit 105, by determining the start point of the movement trajectory as the "chest" that is the operation reference point determined by the reference point determining unit. In other words, the location identifying unit 106 identifies that the mobile device 100 has been housed in the "waist space" that is the reference space in which the end point of the movement trajectory is located. That is, the location identifying unit 106 can identify that the mobile device 100 has been housed in the trouser pocket. Here, the end point of the movement trajectory is a point in the movement trajectory at which the movement trajectory is estimated to be stable according to a predetermined reference. For example, the end point may also be a point after a lapse of a predetermined time since predetermined operation information was inputted. Specifically, the end point may be a point in time 30 minutes after such operation information as "disconnect button" and "fold" was inputted. Note that the predetermined time may be, for example, linked to the display time for a backlight of the mobile device 100.

In addition, FIG. 5B(c) shows an example where the user has housed the mobile device 100 in the chest pocket after checking text messages (FIG. 5B(a)). In this case, as in the case of FIG. 5B(b), the location identifying unit 106 identifies that the mobile device 100 has moved to the "chest space", using the movement trajectory calculated by the trajectory calculating unit 105 and the operation reference point determined by the reference point determining unit 104. That is, the location identifying unit 106 can identify that the mobile device 100 has been housed in the "chest space", that is, the chest pocket of the user.

FIG. 6A is a diagram for describing a reference point rule regarding the reference point "ear". In addition, FIG. 6B is a diagram for describing an example of identifying the location of the mobile device 100 in relation to the user. As shown in FIG. 6B(a), first, the user is making a call on the mobile device 100. In this case, the reference point determining unit 104 determines, as the operation reference point, the reference point "ear" corresponding to operation information "call", by referring to the reference point rule shown in FIG. 6A. Subsequently, as shown in FIG. 6B(b), the user houses the mobile device 100 in the trouser pocket. In this case, as in the case of FIG. 5B, the location identifying unit 106 identifies that the mobile device 100 has moved to the "waist space", based on the operation reference point and the movement trajectory. That is, the location identifying unit 106 can identify that the mobile device 100 has been housed in the trouser pocket. Note that the operation information "call" is an example of a "sound signal". Note that an input of the "sound signal" includes a vocal input by an intended party in addition to a vocal input by the user into the mobile device.

Figure 7A:
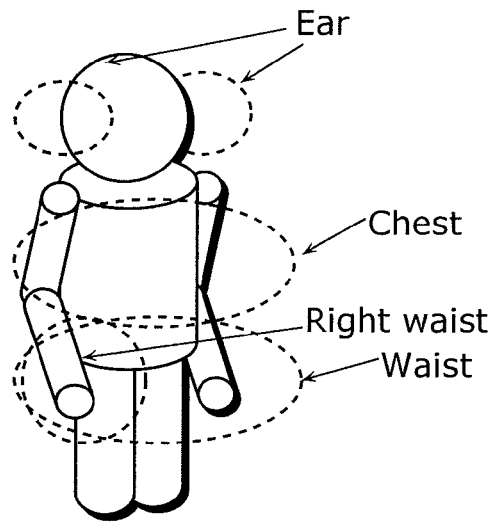
FIG. 7A is a diagram for describing a reference point rule regarding a reference point "waist".
Figure 7B:
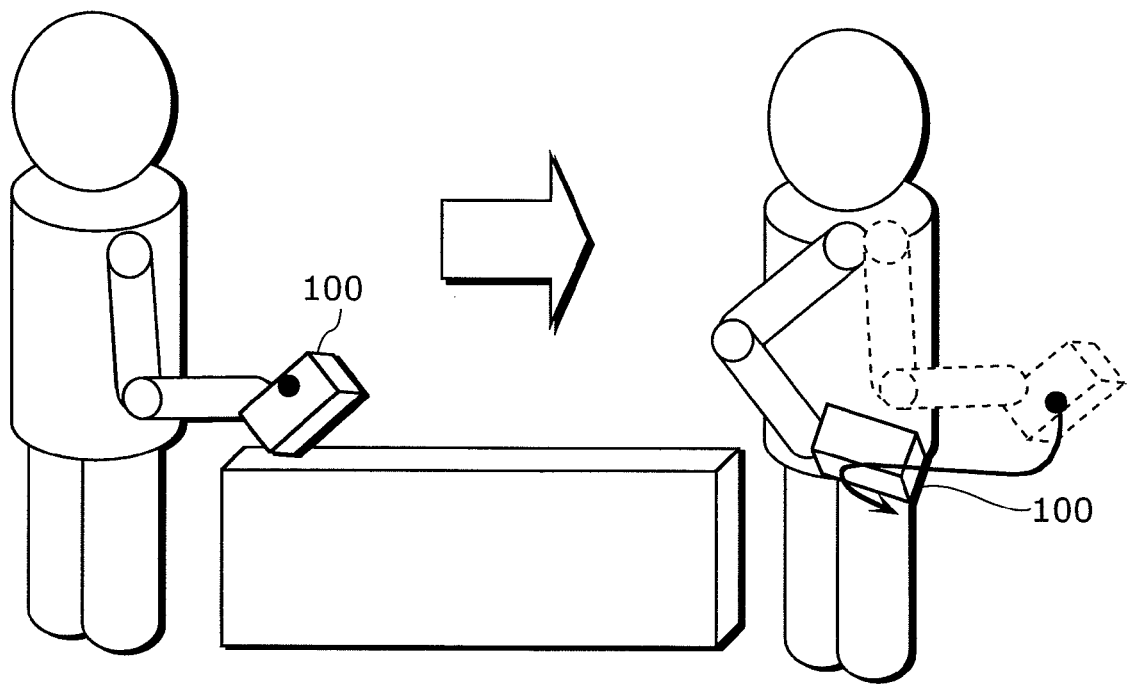
FIG. 7B is a diagram for describing identifying the location of the mobile device in relation to the user.

FIG. 7A is a diagram for describing a reference point rule regarding the reference point "waist". In addition, FIG. 7B is a diagram for describing an example of identifying the location of the mobile device 100 in relation to the user. As shown in FIG. 7B(a), first, the user uses, for example, electronic money such as Icoca (trademark) at a station. In this case, the reference point determining unit 104 determines, as the operation reference point, the reference point "waist" corresponding to the operation information "Icoca", by referring to the reference point rule shown in FIG. 7A. Note that operation information "Edy (trademark)" is another example of electronic money like "Icoca". When using such electronic money, the user needs to move the electronic money closer to a reader irrespective of whether the electronic money is intended for noncontact payment or contact payment. Since the position of an electronic money reader in relation to the human body is generally predetermined, it is possible to cause the reference point rule holding unit 103 to previously hold the position (reference point) in relation to the user when using the electronic money. Note that according to the present embodiment, the reference point rule holding unit 103 holds the reference point rule indicating that the reference point for the electronic money is the "waist". Then, as in the description of FIG. 5B, the location identifying unit 106 identifies that the mobile device 100 has moved into the "waist space", based on the operation reference point and the movement trajectory. That is, the location identifying unit 106 can identify that the mobile device 100 has been housed in the trouser pocket.

Next, the basic operation of the mobile device 100 thus configured according to the first embodiment will be described with reference to the flowchart in FIG. 8.

Figure 8:
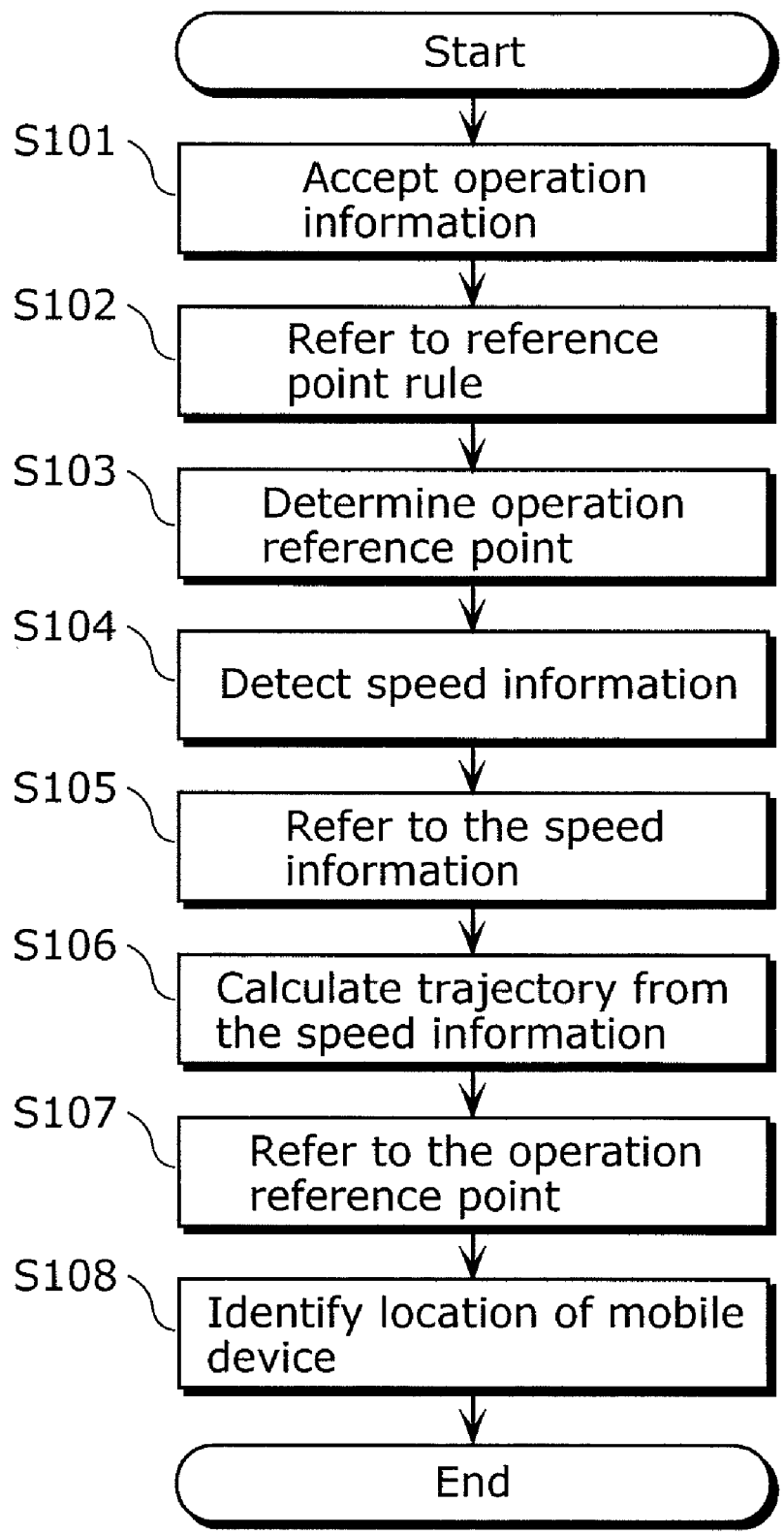
FIG. 8 is a flowchart showing an operation related to identifying the location of the mobile device in relation to the user.

FIG. 8 is a flowchart showing an operation related to identifying the location of the mobile device 100 in relation to the user.

First, the operation input unit 101 receives operation information from the user (Step S101). For example, as shown in FIG. 5A, the operation input unit 101 receives "power button" from the user as operation information.

Then, the reference point determining unit 104 refers to the reference point rule held in the reference point rule holding unit 103 (Step S102), and determines an operation reference point that is a reference point corresponding to the operation information (Step S103). Specifically, as shown in FIG. 5, the reference point rule holding unit 103 holds reference point rules such as a rule indicating that the reference point corresponding to the operation information "power button" is the "chest". Thus, for example, the reference point determining unit 104 determines, as the operation reference point, the reference point "chest" corresponding to the operation information "power button", by referring to this reference point rule.

Next, the sensor unit 102 detects speed information for the mobile device 100 (Step S104). Then, the trajectory calculating unit 105 refers to the speed information detected by the sensor unit 102 (Step S105). Specifically, as shown in FIG. 2, the sensor unit 102 can detect acceleration or the like that is an example of the speed information. Then, the trajectory calculating unit 105 refers to the speed information such as acceleration.

Next, the trajectory calculating unit 105 calculates a movement trajectory based on the speed information (Step S106). Specifically, as shown in FIG. 3, the trajectory calculating unit 105 calculates the movement trajectory of the mobile device 100, based on acceleration and so on.

Next, the location identifying unit 106 refers to the operation reference point determined by the reference point determining unit 104 (Step S107), and identifies the location of the mobile device 100 in relation to the user (Step S108). Specifically, the location identifying unit 106 identifies the location of the mobile device 100 in relation to the user, based on the movement trajectory originating at the operation reference point, as a result of, for example, the user having moved the mobile device 100 into the trouser pocket after checking text messages.

Thus, the mobile device 100 according to the present embodiment identifies the location of the mobile device 100 in relation to the user, based on the operation reference point and the movement trajectory. A conventional mobile device, which can only calculate a relative displacement from a predetermined reference point by using a displacement that can be obtained from the acceleration sensor, is unable to identify where the mobile device is located in relation to the user. In contrast, the mobile device 100 according to the present embodiment can identify the location of the mobile device 100 in relation to the user, such as, where in the user the mobile device 100 has finally been housed, by determining, as the operation reference point, the point (reference point) at which the operation is performed and calculating the destination of the movement trajectory originating at the operation reference point. With this, it is possible to identify the location of the mobile device 100 in relation to the user, such as, where in the user the mobile device 100 has finally been housed.

Particularly, in most cases, a mobile device as represented by the cellular phone can identify, to some extent, the relative location with respect to the user when the functions thereof (call, text-messaging, or the like) are performed. Specifically, when making a call, the user positions a speaker portion of the cellular phone at the ear, and a microphone portion closer to the mouth. When the user performs the operation like this, it is possible to detect, to some extent, the relative locational relationship between the mobile device and the user.

In addition, according to the system described in Non Patent Literature 1, it has been necessary to constantly continue detecting acceleration and so on in order to detect the location of the mobile device in relation to the user. As a result, electric consumption increases and makes it difficult to incorporate the system disclosed in Non Patent Literature 1 into the mobile device that requires prolonged driving using battery. On the other hand, the mobile device 100 according to the present embodiment enables judging at which location the user is carrying the mobile device, only by tracing the movement of the mobile device after the input of the operation information is received. In addition, once the location of the end point is identified, the sensor unit 102 need not detect speed information. That is, the sensor unit 102 only needs to start detecting speed information when the operation input unit 101 receives the input of the operation information, and to finish detecting the speed information when the location is identified by the location identifying unit 106, so that it is not necessary to constantly continue detecting speed information such as acceleration. Thus, the mobile device 100 according to the present embodiment can suppress the power consumption as compared to the system described in Non Patent Literature 1.

Embodiment 2

Next, a mobile device 200 according to a second embodiment of the present invention will be described.

The mobile device 200 according to the present embodiment represents an application of the mobile device location identification according to the present invention.

Conventionally, according to known methods, a text-message receiving mode (operation pattern) is controlled based on the acceleration detected by the mobile device (Patent Literature 1: Japanese Unexamined Patent Application Publication No. 2001-144853). These methods is to judge whether the user is at a stop or walking based on the acceleration detected by the acceleration sensor included in the mobile device, and to switch the mode, which is the text-message receiving mode between vibration and voice. In addition, another known method is to detect that the user is in a car, in a train, or the like by detecting a steady rate of the mobile device, and to switch the mode of the mobile device to automatic answering based on the detected result. Furthermore, yet another generally known method is to detect the location of the user (mobile device) using a tag or a GPS, and to switch the text-message receiving mode to vibration when the detected location is a movie theater, the train, or the like. However, these methods do not consider at which location in relation to the user the mobile device is being carried.

According to the method shown in the present invention, it is possible to switch the mode of the mobile device according to the location at which the user carries the mobile device.

Figure 9:
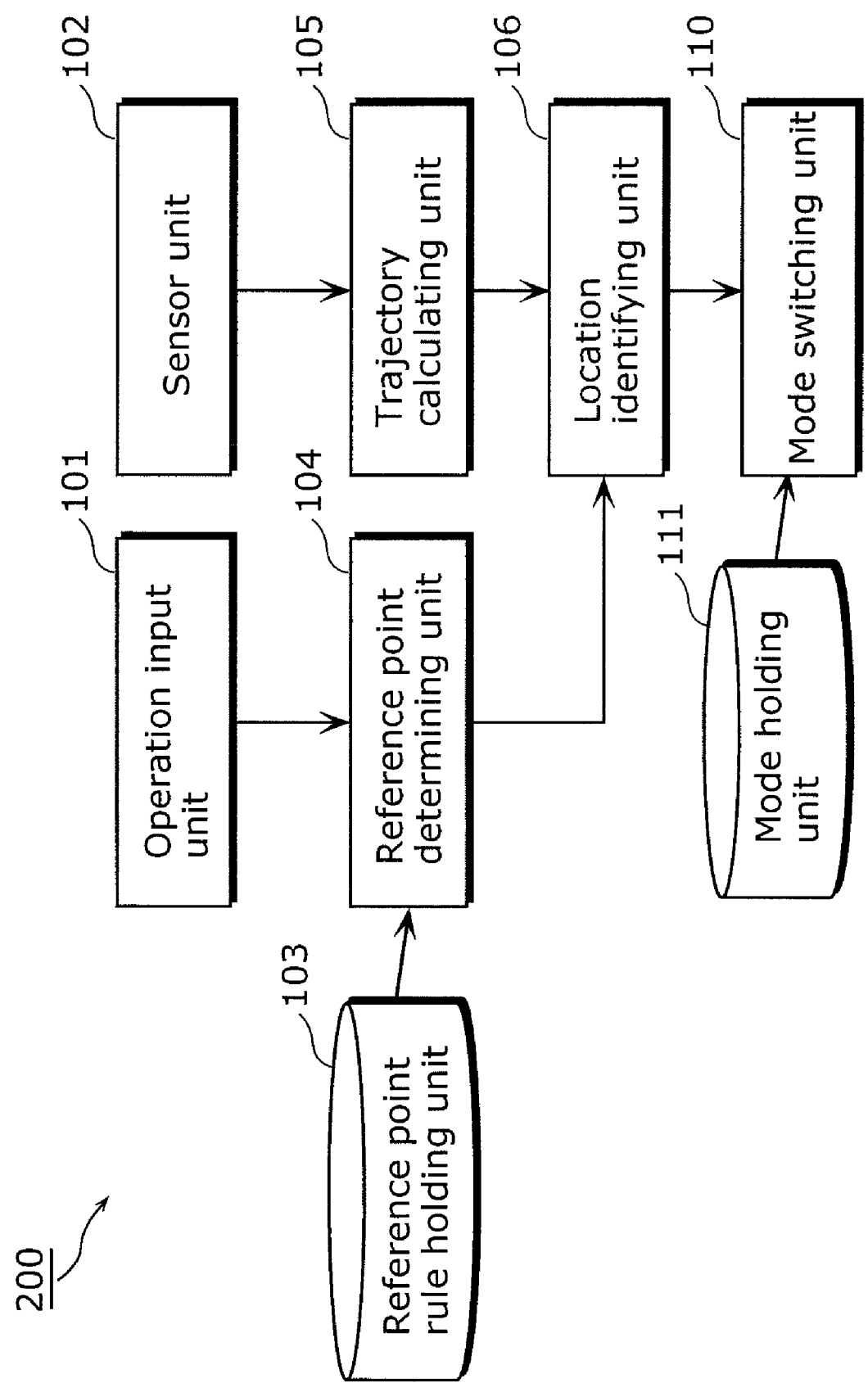
FIG. 9 is a block diagram showing a functional configuration that is characteristic of a mobile device according to a second embodiment of the present invention.

FIG. 9 is a block diagram showing a functional configuration that is characteristic of the mobile device 200 according to the second embodiment of the present invention. The mobile device 200 according to the second embodiment further includes a mode switching unit 110 and a mode holding unit 111 in addition to the constituent elements included in the mobile device 100 according to the first embodiment. Note that the same constituent elements as those of the mobile device 100 according to the first embodiment will be given the same numerical signs, and the description thereof will be omitted.

The mode holding unit 111 holds a rule (hereinafter, referred to as a mode rule) indicating which mode is to be selected according to a device location that indicates the location of the end point identified by the location identifying unit 106. Here, the mode means each of the settings that can be switched when the mobile device is equipped with a plurality of function and operation settings. Specifically, for example, the mode represents a setting for each of the operations such as "vibration", "sound", and "light" to be performed when receiving a text-message.

FIG. 10 is a diagram showing an example of the mode rule. As the figure shows, for example, in the mode rule, a "vibration" mode is set for the device location "chest space" (the mobile device is present in the chest pocket). On the other hand, in a "sound" mode, the device location corresponds to the "waist space", that is, the waist pocket. When the device location is the "waist space", there is a possibility of the user being unable to notice even when notified by vibration, and thus it is better to notify the user by sound. Thus, the mode holding unit 111 holds the "sound" mode, as a mode rule, for the device location "waist space". In addition, when the device location is "waist space", the mode may be "flash light" instead of "sound". Note that the mode rule may be set by the user.

Figure 11:
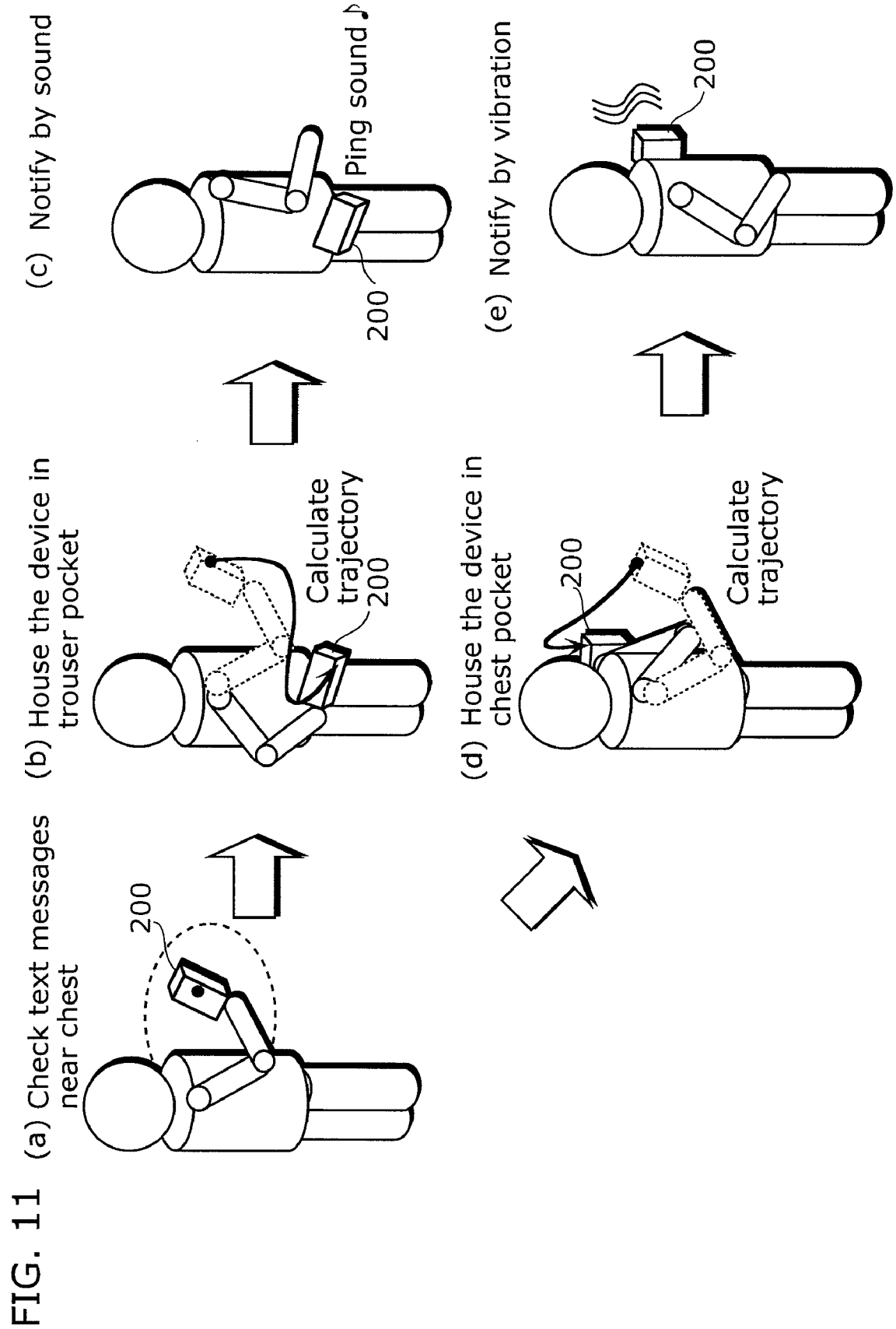
FIG. 11 is a diagram for describing mode switching.

The mode switching unit 110 switches the mode according to the location of the mobile device 200 identified by the location identifying unit 106. In other words, the mode switching unit 110 obtains, with reference to the mode rule, the mode corresponding to the location of the end point identified by the location identifying unit 106, and switches the setting according to the obtained mode. FIG. 11 is a diagram for describing the mode switching.

FIG. 11 shows two examples where the user checks text messages (FIG. 11(a)) and then houses the mobile device 200 in the trouser pocket (FIG. 11(b)), and where the user checks text messages and then houses the mobile device 200 in the chest pocket (FIG. 11(d)). The location identifying unit 106 identifies, from the movement trajectory originating at the operation reference point "chest space", that the mobile device 200 has been housed in the trouser pocket in the "waist space" (FIG. 11(b)) or that the mobile device 200 has been housed in the chest pocket in the "chest space" (FIG. 11(d)). The mode switching unit 110 switches the mode according to the identified location. Specifically, the mode switching unit 110 switches the mode to "sound" when the device location is in the "waist space". On the other hand, when the device location is in the "chest space", the mode switching unit 110 switches the mode to "vibration". With this, for example, in case of receiving a call from a third party when the mobile device 200 is in the trouser pocket, the mobile device 200 can notify the user by "sound" (FIG. 11(c)). On the other hand, in case of receiving a call from the third party when the mobile device 200 is in the chest pocket, the mobile device 200 can notify the user by "vibration" (FIG. 11(e)).

In addition, as an application of the mode switching, for example, in the case where the mobile device 200 is in the chest pocket, the mode switching unit 100 may output sound or vibration when the tilt detected by the sensor unit 102 is larger than a predetermined threshold. With this, the mobile device 200 can alert the user to be careful about the mobile device 200 falling out of the pocket. This means that, by simply detecting the tilt of the sensor unit 102 such as the gyroscope, the mobile device 200 ends up notifying the user of the location irrespective of whether the mobile device 200 is in the user's waist pocket or in a bag when the tilt larger than the predetermined threshold is constantly detected. However, as shown in the present embodiment, the mobile device 200 can automatically identify the location of the mobile device 200 itself, so that the mobile device 200 can alert by tilt only when the mobile device 200 is in the chest pocket.

Furthermore, when the user has a medical pacemaker, the mode switching unit 100 may automatically turn off the power when the mobile device 200 is in the chest pocket or the like.

Thus, by automatically identifying the location in which the mobile device 200 is being carried in relation to the user, the mobile device 200 can automatically switch the mode of the mobile device 200 (power ON/OFF of the mobile device 200, or notification to notify a call, a text message, and so on) to a condition more appropriate for the user.

Embodiment 3

Next, a mobile device 300 according to a third embodiment of the present invention will be described.

Conventionally, a known method is to judge a user's action, using acceleration detected by the mobile device (Patent Literature 2: Japanese Patent No. 3505040, and so on). These are the methods for judging whether or not the user is walking or at a stop, using the acceleration and so on obtained by the acceleration sensor included in the mobile device.

However, the value obtained by the acceleration sensor or the like and used for such action judgment varies depending on the location at which the user carries the mobile device, and therefore it is important at which location the mobile device is carried in relation to the user. According to the method shown in the present invention, it is possible to judge at which location the user carries the mobile device, thus allowing accurate judgment of the detected action.

Figure 12:
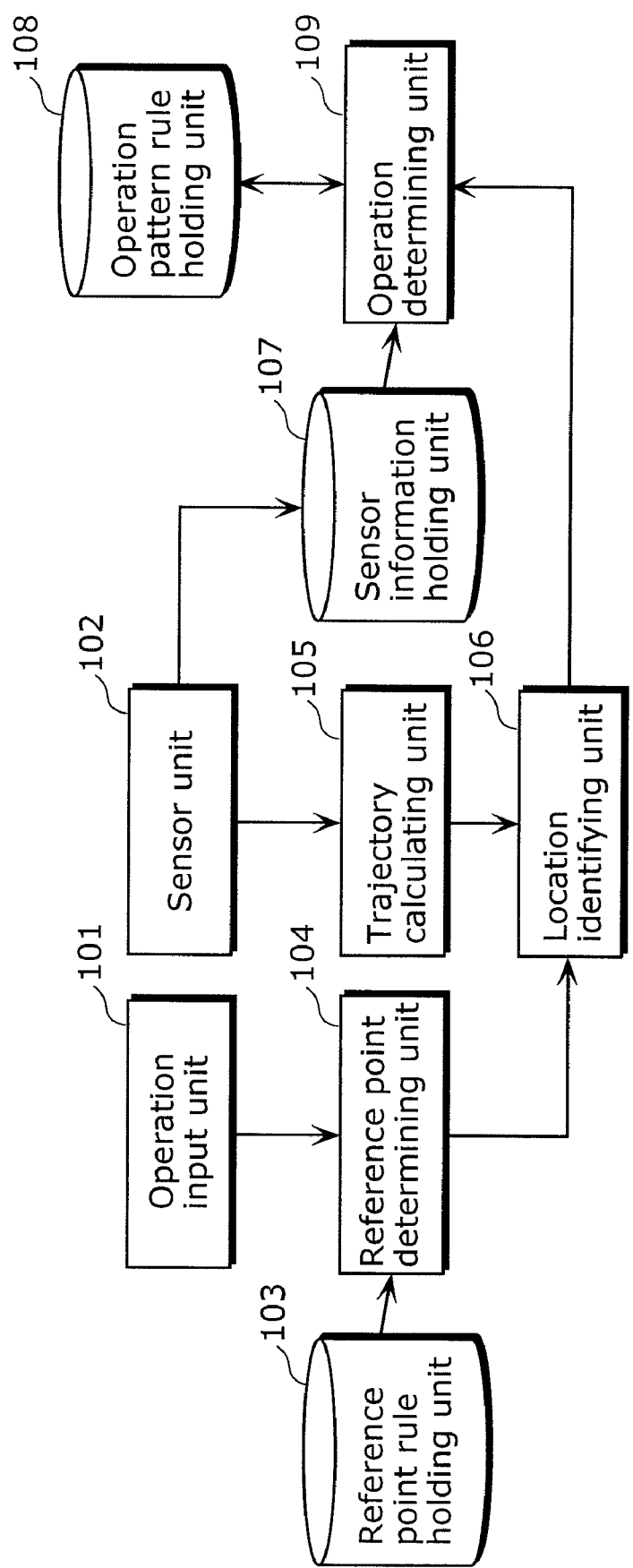
FIG. 12 is a block diagram showing a functional configuration that is characteristic of a mobile device according to a third embodiment of the present invention.

FIG. 12 is a block diagram showing a functional configuration that is characteristic of the mobile device 300 according to the third embodiment of the present invention. The mobile device 300 according to the third embodiment further includes a sensor information holding unit 107, an action pattern rule holding unit 108, and an action judging unit 109 in addition to the constituent elements included in the mobile device 100 according to the first embodiment. Note that the same constituent elements as those of the mobile device 100 according to the first embodiment will be assigned with the same numerical signs, and the description thereof will be omitted.

The sensor information holding unit 107 holds speed information detected by the sensor unit 102. The action pattern rule holding unit 108 holds a user action rule (hereinafter, referred to as an action pattern rule) corresponding to the pattern of the detected speed information and the device location.

FIG. 13 is a diagram showing an example of the action pattern rule held by the action pattern rule holding unit 108. When judging the user action based on the speed information obtained by the acceleration sensor, an angle speed sensor, and so on, a general mobile device judges the user action depending on whether or not a predetermined periodic oscillation, which appears along with motion, is observed. In addition, the periodic oscillation is detected using Fourier transform and so on. For example, when the user is walking, the sensor unit 102 detects a periodic oscillation and an angle change. In addition, a cycle of the detected periodic oscillation and an angle change vary depending on the walking speed. Thus, the mobile device can differentiate walking from running, according to the values of the cycle or the angle. On the other hand, when there is no periodic oscillation or angle change, the mobile device judges that the user is at a stop, or judges, from a discrete sensor value, that the user is gripping something (gripping). Thus, the action pattern rule holding unit 108 included in the mobile device 300 according to the present embodiment holds action pattern rules for judging whether the user is walking, running, at a stop, or the like, based on the angle or cycle.

In addition, the value detected by the sensor varies depending on a fixing point of the sensor. For example, in the case of walking or running, it is possible to judge the action when the mobile device is in the trouser pocket. On the other hand, when the mobile device is in the chest pocket, it is not possible to judge the action because the oscillation and angle change along with the walking are smaller than those detected in the trouser pocket. Thus, the action pattern rule holding unit 108 included in the mobile device 300 according to the present embodiment holds an action pattern rule according to the location of each device.

For example, according to the action pattern rule shown in FIG. 13, when the mobile device 300 is in the "waist space (trouser pocket)" and when the "angle is 0 degree or larger but below 10 degrees" and a long "cycle of 0.5 ms or more" appears, the user action is set to "stop" due to absence of a periodic action within a short period of time. In addition, likewise, when the mobile device 300 is in the "waist space (trouser pocket)", and when the "angle is 10 degrees or larger but below 15 degrees" and a short "cycle of 0.3 ms or more but below 0.5 ms" appears, the user action is set to "walking" due to presence of a periodic action. Furthermore, likewise, when the mobile device 300 is in the "waist space (trouser pocket)", and when the "angle is 15 degrees or larger" and a short "cycle of 0.3 ms or more but below 0.5 ms" appears, the user action is set to "running" due to presence of a periodic action and a large oscillation. In addition, when the mobile device 300 is in the "waist space (trouser pocket)", the pattern is set to "unable to judge" in the action pattern rule because it is not possible to judge the action of "gripping" something, from speed information only.

On the other hand, when the mobile device 300 is in the "waist space (trouser pocket)", and when the "angle is 0 degree or larger but below 5 degrees" and a long "cycle of 0.5 ms or more" appears, the user action is set to "stop" in the action pattern rule shown in FIG. 13 due to absence of a periodic action. In addition, likewise, when the mobile device 300 is in the "chest space (chest pocket)", and when the "angle is 5 degrees or larger but below 10 degrees" and a short "cycle of 0.3 ms or more but below 0.5 ms" appears, the user action is set to "walking" because of presence of a periodic action. Furthermore, likewise, when the mobile device 300 is in the "chest space (chest pocket)", and when the "angle is 10 degrees or larger but below 15 degrees" and a short "cycle of 0.3 ms or more but below 0.5 ms" appears, the user action is set to "running" due to presence of a periodic action and a large oscillation. Thus, the angle pattern corresponding to the operation varies depending on the device location because an angle width resulting from walking or running is smaller in the chest pocket than in the trouser pocket. Note that in terms of "gripping", the mode is set to "unable to judge" when the mobile device is in the "waist space (trouser pocket)"; however, when the mobile device 300 is in the "chest space (chest pocket)", and when the "angle is 15 degrees or larger" and a long "cycle of 0.5 ms or more" appears, the user action is set to "gripping".

The action judging unit 109 judges the action with reference to the speed information held in the sensor information holding unit 107 and the action pattern rule held by the action pattern rule holding unit 108.

FIG. 14 is a diagram for describing judging actions. The graph in FIG. 14(a) is a graph showing an angle change when carrying the mobile device 300 in the "waist space (trouser pocket)", with the horizontal axis indicating the time and the vertical axis indicating the angle. As the figure shows, until time T1, no angle change or no periodic action is observed, so that the action judging unit 109 judges the user action as "stop" by referring to the action pattern rule. In addition, from time T2 to T3, the angle change is 10 degrees or larger and a periodic action is observed (for example, a cycle of 0.4 ms), so that the action judging unit 109 judges the user action as "walking" by referring to the action pattern rule. In addition, after time T3, no periodic action is observed in spite of the presence of an angle change, so that the action judging unit 109 judges the user action as "unable to judge" by referring to the action pattern rule.

On the other hand, the graph in FIG. 14(b) is a graph showing an angle change when having the mobile device 300 in the "chest area (trouser pocket)", with the horizontal axis indicating the time and the vertical axis indicating the angle. As the figure shows, until time T1, no angle change or no periodic action is seen, so that the action judging unit 109 judges the user action as "stop" by referring to the action pattern rule. In addition, from time T1 to T2, the angle change is 5 degrees or larger and a periodic action (for example, a cycle of 0.4 ms) is observed, so that the action judging unit 109 judges the user action as "walking" by referring to the action pattern rule. In addition, after time T2, a long cycle (of, for example, 0.5 ms or more) is seen in spite of an angle change, so that the action judging unit 109 judges the user action as "gripping" by referring to the action pattern rule.

Thus, even when it is difficult to detect the action in detail only by using information from the device sensor, with the mobile device 300 according to the present embodiment, it is possible to identify the location of the mobile device 300, and to judge actions more accurately.

Embodiment 4

Next, a mobile device 400 according to a fourth embodiment of the present invention will be described.

The mobile device 400 according to the fourth embodiment is the same as the mobile device 100 according to the first embodiment except that part of the function of the reference point determining unit 104 is different. In other words, the mobile device 400 according to the fourth embodiment includes the same constituent elements as those in the mobile device 100 according to the first embodiment shown in FIG. 1, and thus the description of the block diagram showing the functional configuration of the mobile device 400 will be omitted. In addition, the description of the constituent elements having the same functions as those of the mobile device 100 according to the first embodiment will be omitted.

In the case where the operation input unit 101 has newly received plural pieces of operation information and the operation information includes a sound signal resulting from a call, the reference point determining unit 104, which is included in the mobile device 400, determines, as the operation reference point, a point corresponding to the sound signal resulting from the call.

The mobile device 100 according to the first embodiment has determined the operation reference point for each of the plural pieces of operation information received by the operation input unit 101, and has identified the location of the mobile device 100, using the determined operation reference point and the movement trajectory. Thus, when the operation input unit 101 serially receives plural pieces of operation information, the mobile device 100 identifies the location of the mobile device 100 based on the reference point corresponding to a last piece of operation information. In other words, the mobile device 100 determines the operation reference point such that the distance of the movement trajectory to the end point is shortest when assuming that the operation reference point is a start point, and thus it is possible to reduce errors in identifying the location. However, when the operation information includes "call", it is not necessarily possible to reduce errors when setting the operation reference point to the reference point corresponding to the last piece of operation information. Hereinafter, the description will be given using FIG. 15.

Figure 15:
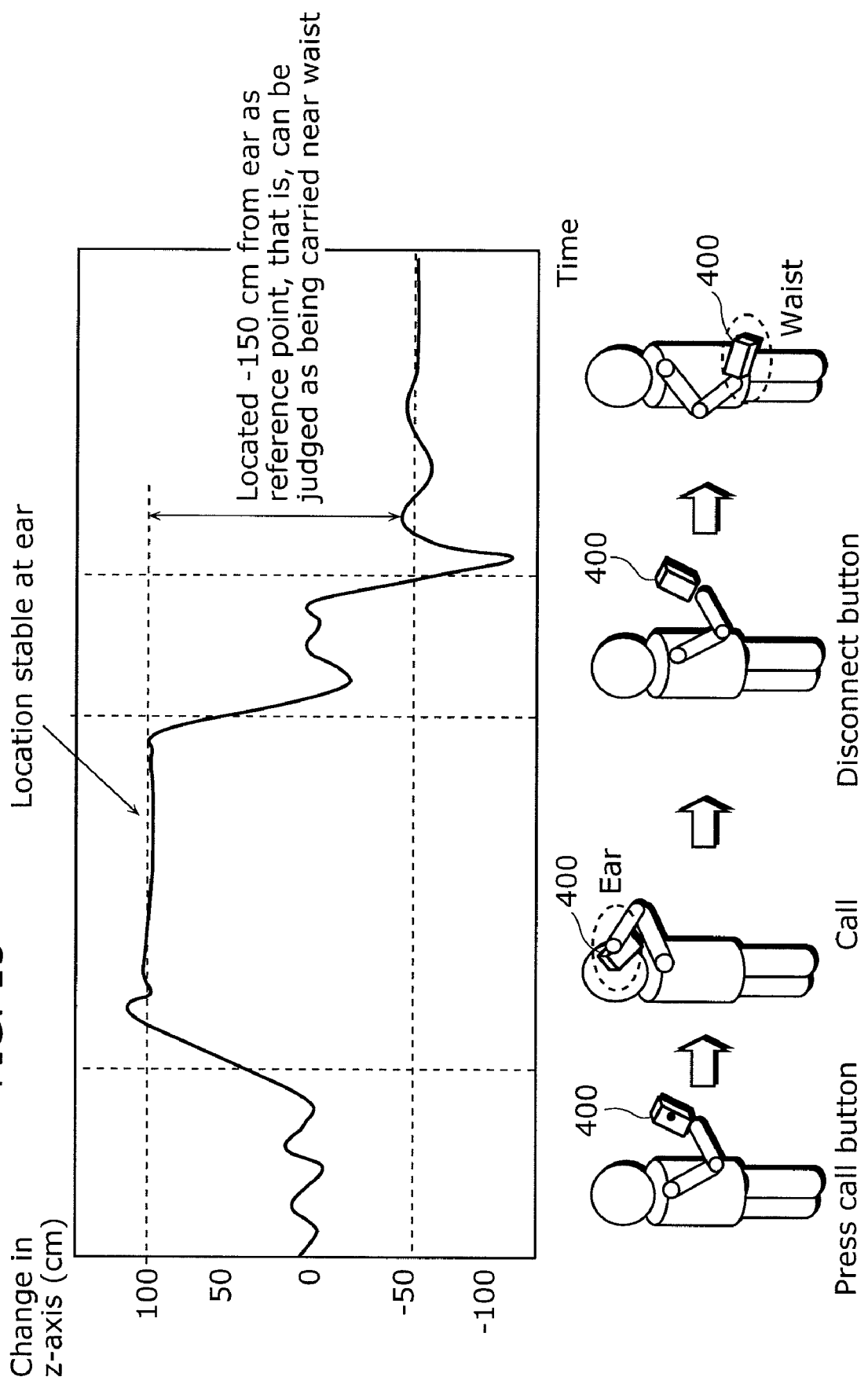
FIG. 15 is a diagram showing a displacement in a z-axis direction (vertical direction with respect to the ground) of the mobile device.

FIG. 15 is a diagram showing a temporal displacement of the mobile device 400 in the z-axis direction (vertical to the ground) in the case where: first, the mobile device 400 receives a call, and then, the user presses the call button, then presses the "disconnect" button after having the "call" for a while, and houses the mobile device 400 in the trouser pocket. The graph in FIG. 15 indicates, as the origin (0 cm), the point at which the "call button" is pressed first.

As FIG. 15 shows, first, the value is observed shaking at a point where the "call button" is pressed. Generally, when pressing the "call button" or performing an operation on the device, the user does not always fix the mobile device. That is, since acceleration is detected as a result of the pressure or the like caused by the user pressing the button, it is common that some shaking is generated.

Next, since the user has moved the mobile device to the ear to make a call, the mobile device has moved 100 cm in the z-axis direction. Then, during the "call", no significant change is generated in the location of the mobile device. Generally, since the user fixes the mobile device at the ear when calling on the phone, the shifting of the mobile device location is unlikely to be caused during the "call".

Subsequently, the user finishes the call, returns the mobile device near to the chest again, and presses the "disconnect button" to cut the call. The graph shows that the mobile device has moved to near 0 cm again, but shaking is caused as with the case of the "call button". Furthermore, subsequently, since the user moves the mobile device to the waist, the mobile device is currently in a steady state at a location approximately −50 cm.

Thus, in the case of serially receiving such plural pieces of operation information, it is a problem to which piece of operation information the operation reference point should be set to correspond. In this case, generally, the mobile device determines, as the operation reference point, the reference point corresponding to the piece of operation information that is last received. However, when the operation information includes "call", it is preferable that the mobile device set the operation reference point to the "ear". Thus, the mobile device 400 can improve accuracy of identifying the location in relation to the user by setting the operation reference point to the "ear" from which information on a stable and less changeable position can be obtained. For example, when the "ear" is specified as the operation reference point, the mobile device 400 can finally judge, with accuracy, that the location −150 cm, that is, the "waist space (trouser pocket)" is the location in which the mobile device 400 has been housed.

Note that in the present embodiment the operation reference point has been set to the reference point corresponding to the sound signal resulting from a call but is not necessarily limited to the sound signal resulting from the call. For example, the reference point corresponding to such operation information as videotaping and camera focusing may also be set as the operation reference point.

Embodiment 5

Next, a mobile device 500 according to a fifth embodiment of the present invention will be described.

The mobile device 100 according to the first embodiment has identified the location of the mobile device 100, using the previously-stored reference points and reference spaces (starting from the top 30 cm for the "ear", another 70 cm for the "chest", and another 70 cm for the "waist") as shown in FIG. 4. However, in some cases, the location thus identified using such uniform, previously-stored reference points and reference spaces may be less accurate due to personal differences between users. Thus, the mobile device 500 according to the fifth embodiment has a feature that improves the accuracy of location identified by the mobile device 500. Hereinafter, the mobile device 500 according to the present embodiment will be described using FIGS. 16, 17, and 18.

Figure 16:
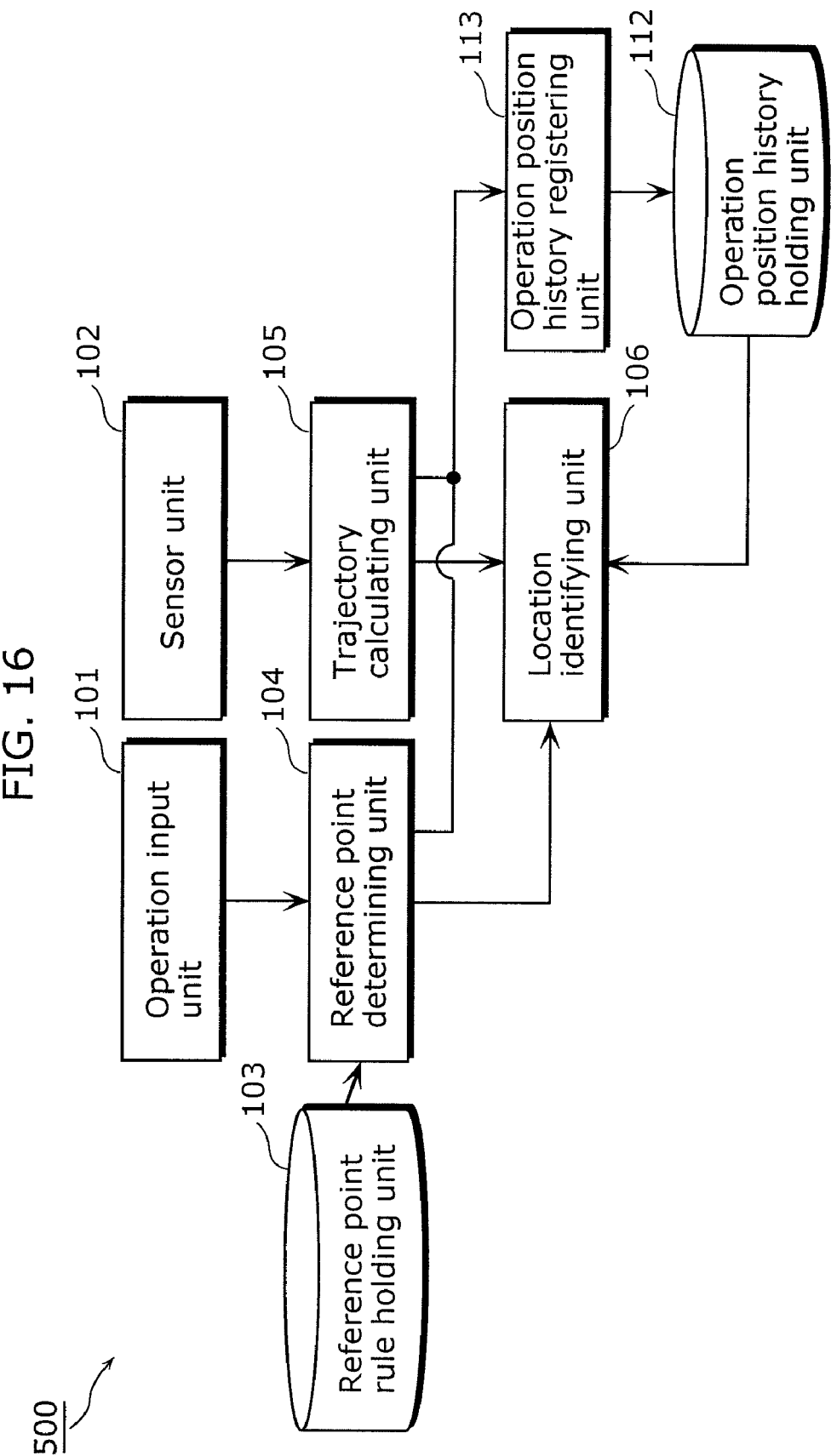
FIG. 16 is a block diagram showing a functional configuration that is characteristic of a mobile device according to a fifth embodiment of the present invention.

FIG. 16 is a block diagram showing a functional configuration that is characteristic of the mobile device 500 according to the fifth embodiment of the present invention. The mobile device 500 according to the fifth embodiment further includes an operation position history holding unit 112 and an operation position history registering unit 113 in addition to the constituent elements included in the mobile device 100 according to the first embodiment. Note that the same constituent elements as those of the mobile device 100 according to the first embodiment will be assigned with the same numerical signs, and the description thereof will be omitted.

The operation position history holding unit 112 holds position information of the operation reference point.

When assuming, as a start point, a first operation reference point determined by the reference point determining unit 104, and assuming, as an end point, a second operation reference point determined by the reference point determining unit 104 using the movement trajectory calculated by the trajectory calculating unit 105, the operation position history registering unit 113 registers, on the operation position history holding unit 112, the location of the end point as position information for the second operation reference point.

The location identifying unit 106 identifies the location of the end point based on the position information on the second operation reference point held in the operation position history holding unit 112, when the point corresponding to the operation reference point is assumed to be the start point.

Hereinafter, the operation position history holding unit 112 and the operation position history registering unit 113 will be described in detail using FIGS. 17 and 18.

Figure 17:
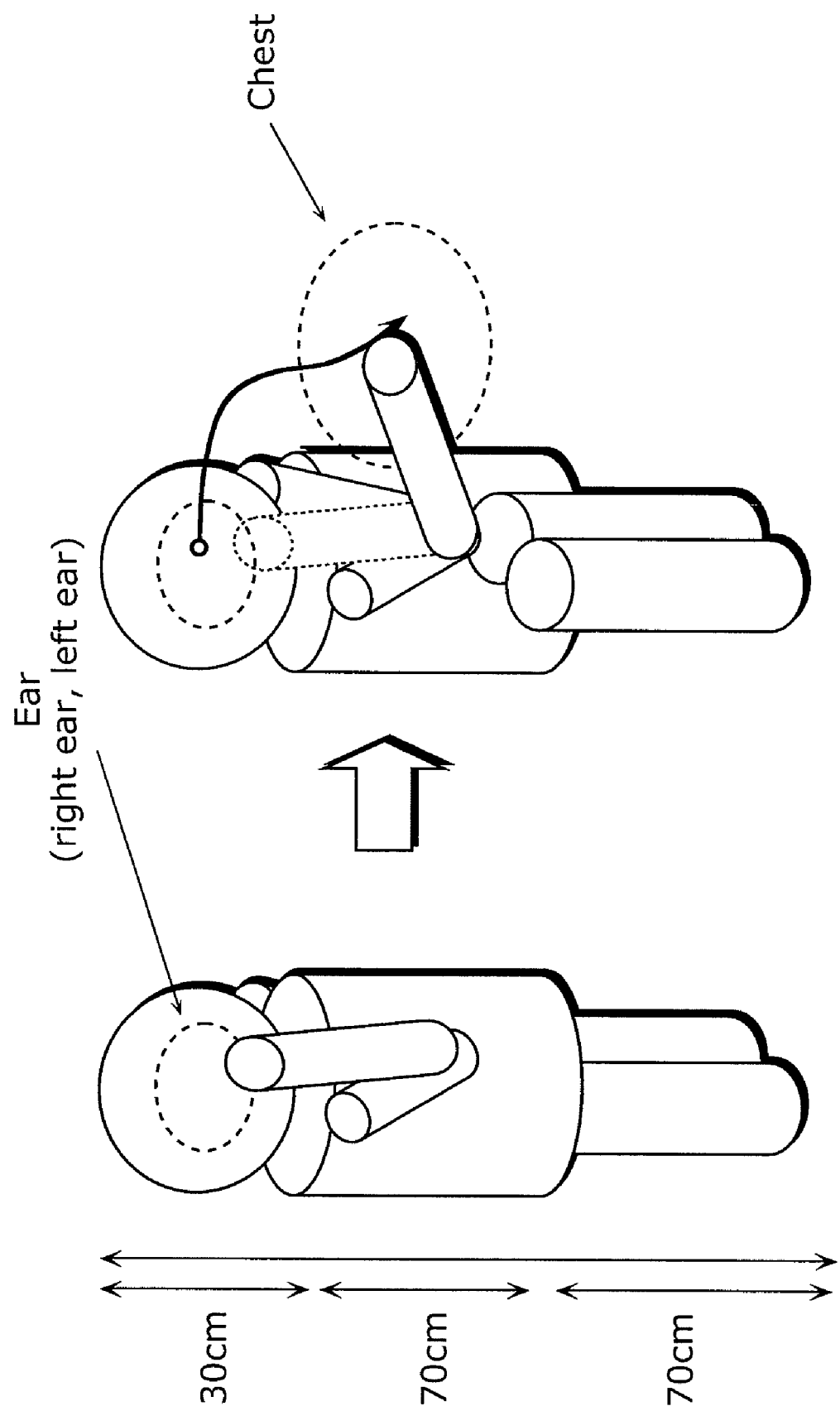
FIG. 17 is a diagram showing that the user is performing operation such as pressing button near the chest after calling at the ear.

FIG. 17 is a diagram showing that the user is performing operation such as pressing a button near the chest after making a call at the ear. For the reference point shown in FIG. 4, the reference point has been predetermined in an order of, from the top, 30 cm as the "ear", another 70 cm as the "chest", and yet another 70 cm as the "waist". However, the height and waist positions are different between individual users. Thus, in the case where operation information corresponding to the "ear" and operation information corresponding to the "chest" are serially received, the operation position history registering unit 113 calculates the position information on the reference point "chest", based on the movement trajectory from the "ear" to the "chest", and registers the calculated position information on the operation position history holding unit 112.

Figure 18:
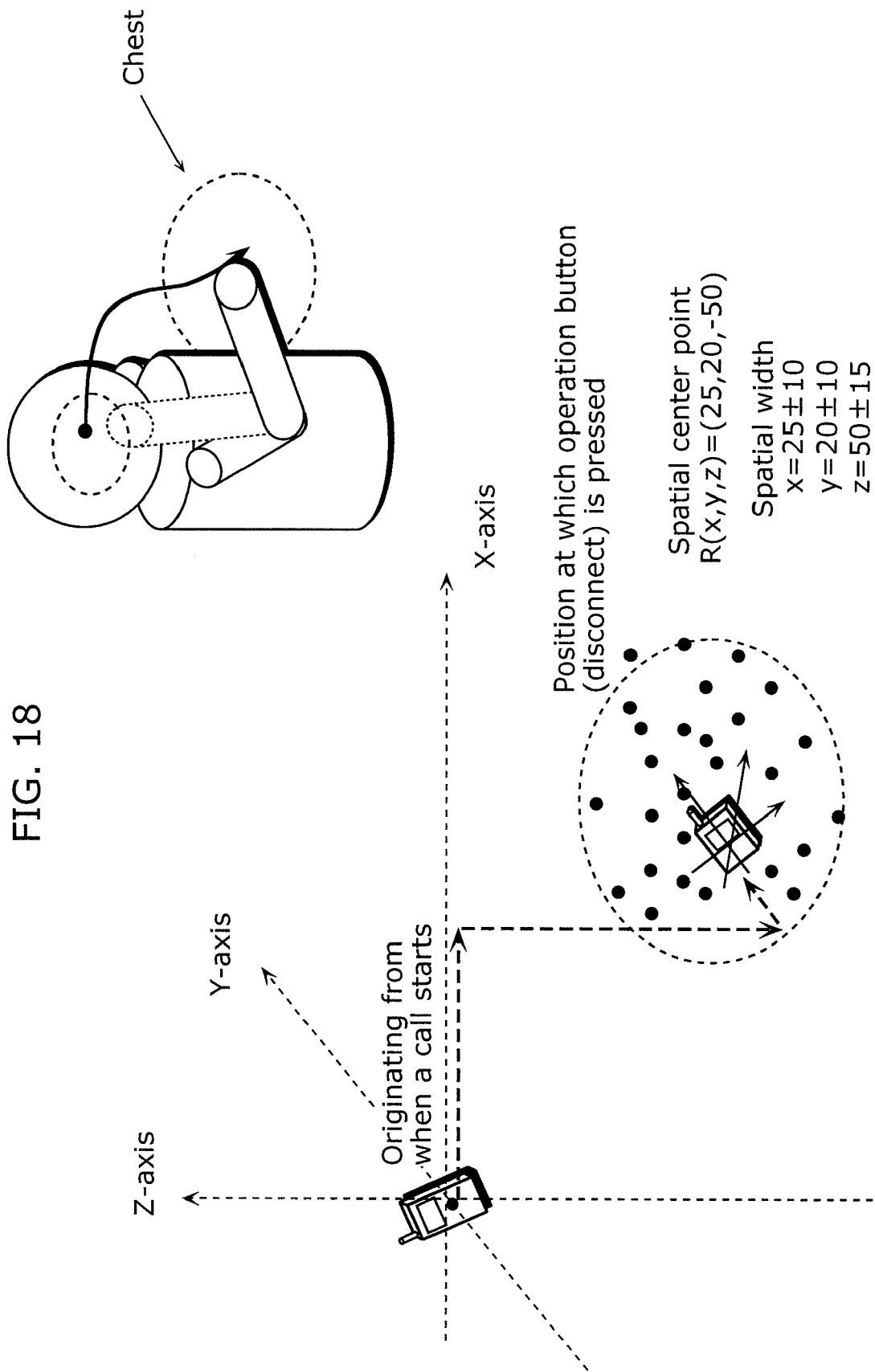
FIG. 18 is a diagram which plots spatial position information obtained from a movement trajectory.

FIG. 18 is a diagram which plots spatial position information obtained from the movement trajectory when, based on the reference point "ear" corresponding to operation information "call", the operation information corresponding to the reference point "chest" is received after the "call". Here, it is assumed that average coordinates (25, 20, −50) and standard deviation (10, 10, 15) are obtained as an average and a standard deviation calculated from these plotted points. In this case, for example, the average coordinates (25, 20, −50) are position information corresponding to the reference point "chest" of the user. In addition, for example, a space represented by $x=25\pm10$, $y=25\pm10$, $z=-50\pm15$ is the position information corresponding to the "chest space" of the user. Accordingly, to this user, it is possible to personally apply this space as the "chest space", and a space more negative in the z-axis direction as the "waist space". Then, using the reference point and reference space thus personally applied, the location identifying unit 106 can identify the end point of the movement trajectory, that is, the location of the mobile device 500 in relation to the user.

Note that it is not essential to use an average for the position information corresponding to the reference point, and for example, a centroid which is calculated to add a larger weight to more-newly registered information may be used. In addition, it is not essential to use variance to calculate position information corresponding to the reference space, and the position information may be simply calculated such that the space includes all the positions indicated by the information held in the operation position history holding unit 112 and corresponding to the reference point.

Note that the mobile device 500 according to the present invention may consider the difference between the right and left ears. For example, when calling, the sound receiver is put to the ear, and the sound sender is put to the mouth, thus causing a tilt in the mobile device 500 with respect to the ground. Thus, when the device 500 further includes a geomagnetic sensor or the like and can detect the tilt of the mobile device 500 thereby, it is possible to determine whether the user is putting the mobile device 500 to the right ear or to the left ear. As a result, the mobile device 500 can determine the reference point and the reference space during the operation performed near the chest, thus also enabling the mobile device 500 to personally apply the reference point with more accuracy.

Embodiment 6

Next, a mobile device 600 according to a sixth embodiment of the present invention will be described.

The mobile device 600 according to the sixth embodiment determines the end point of the movement trajectory, using characteristics of the movement trajectory that result from an error in the speed information detected by the sensor unit 102. Hereinafter, the mobile device 600 according to the present embodiment will be described using FIGS. 19 and 20.

Figure 19:
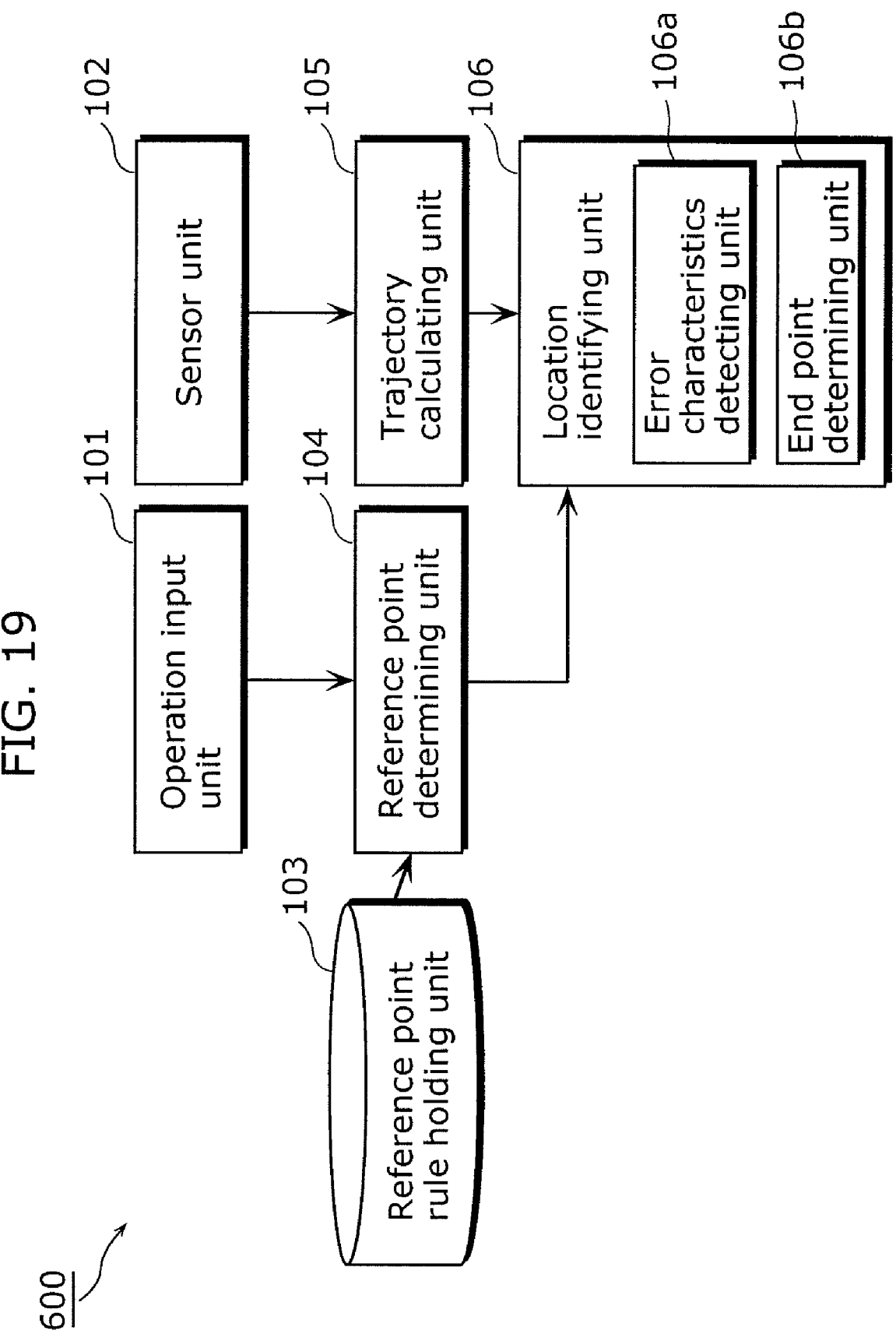
FIG. 19 is a block diagram showing a functional configuration that is characteristic of a mobile device according to a sixth embodiment of the present invention.

FIG. 19 is a block diagram showing a functional configuration that is characteristic of the mobile device 600 according to the sixth embodiment of the present invention. The mobile device 600 according to the sixth embodiment is different from the mobile device 100 according to the first embodiment in that the location identifying unit 106 has an error characteristics detecting unit 106a and an end point determining unit 106b. Note that the same constituent elements as those of the mobile device 100 according to the first embodiment will be assigned with the same numerical signs, and the description thereof will be omitted.

The error characteristics detecting unit 106a detects the characteristics of the movement trajectory that result from the error in the speed information detected by the sensor unit 102. Specifically, when the sensor unit 102 includes an acceleration sensor, the error characteristics detecting unit 106a detects a quadratic change in the location of the mobile device 600, which results from the error in the acceleration detected by the sensor unit 102.

The end point determining unit 106b determines the end point of the movement trajectory according to the characteristics of the movement trajectory that have been detected by the error characteristics detecting unit 106a. Specifically, when the sensor unit 102 includes the acceleration sensor, the end point determining unit 106b determines, as the end point, the point at which the error characteristics detecting unit 106a starts detecting the quadratic change.

In addition, the end point determining unit 106b determines the end point based on whether or not the operation input unit 101 has received the input of the operation information and whether or not the quadratic change continues within the predetermined time after the quadratic change starts to be detected. Specifically, the end point determining unit 106b judges whether or not the operation input unit 101 has received the input of the operation information and whether or not the quadratic change continues, within the predetermined time after the quadratic change starts to be detected. Then, the end point determining unit 106b determines, as the end point, a point at which the quadratic change starts to be detected, when judging that the operation input unit 101 has not received the input of the operation information and that the quadratic change continues. On the other hand, the end point determining unit 106b does not determine, as the end point, the point at which the quadratic change starts to be detected, when judging that the operation input unit 101 has received the input of the operation information or that the quadratic change does not continue.

Note that the location identification (dead reckoning) based on acceleration generally includes an error caused by a drift phenomenon or the like of the sensor. Especially, it is generally known that when the sensing continues for a long time, the error is quadratically added, so that it becomes difficult to identify the location. In other words, the mobile device 600 according to the present embodiment determines the end point of the movement trajectory, using the drift phenomenon as described above. Hereinafter, the error characteristics detecting unit 106a and the end point determining unit 106b will be described in detail using FIG. 20.

Figure 20:
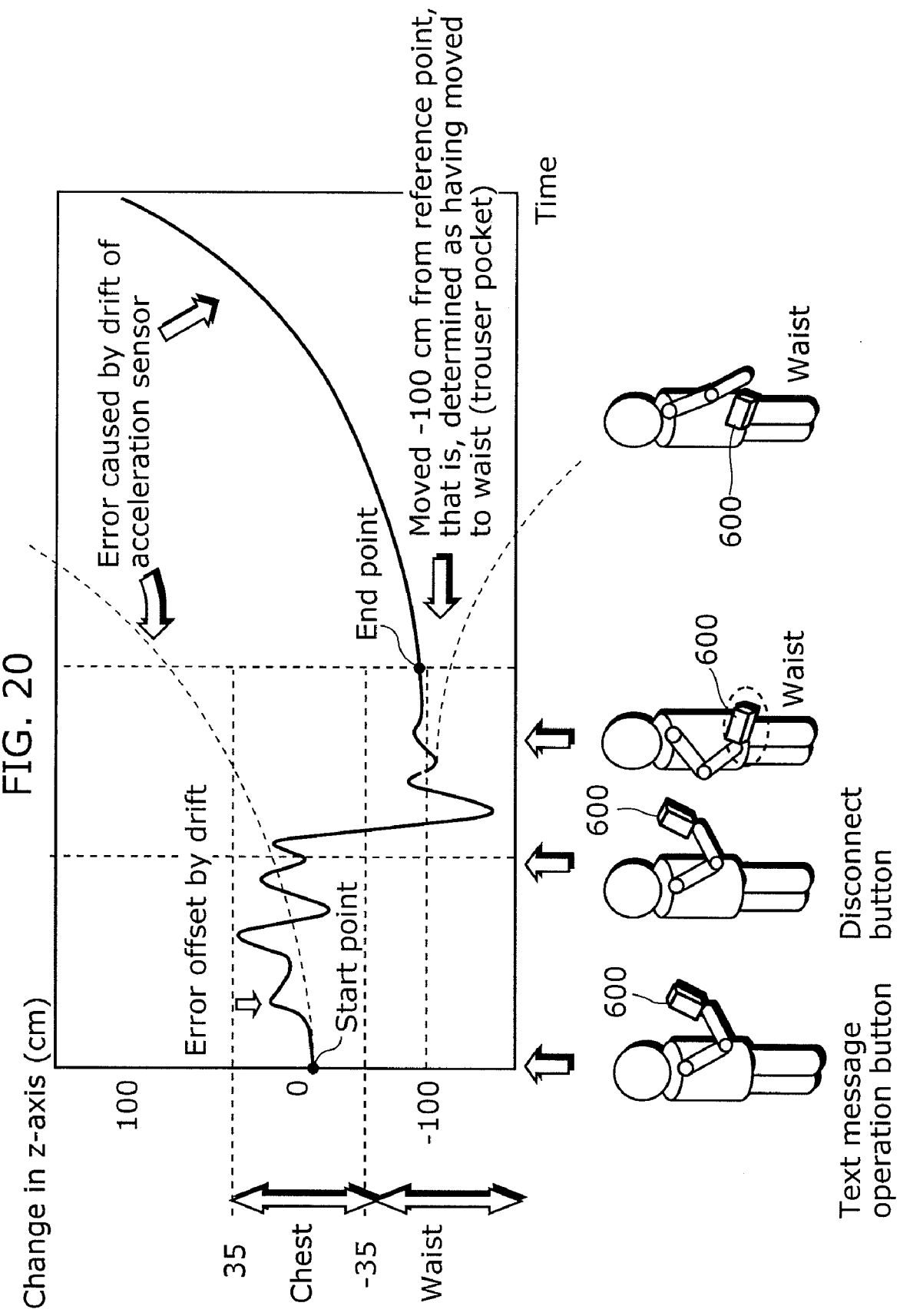
FIG. 20 is a diagram showing a displacement in a z-axis direction (temporal change in location) of the mobile device.
Figure 21:
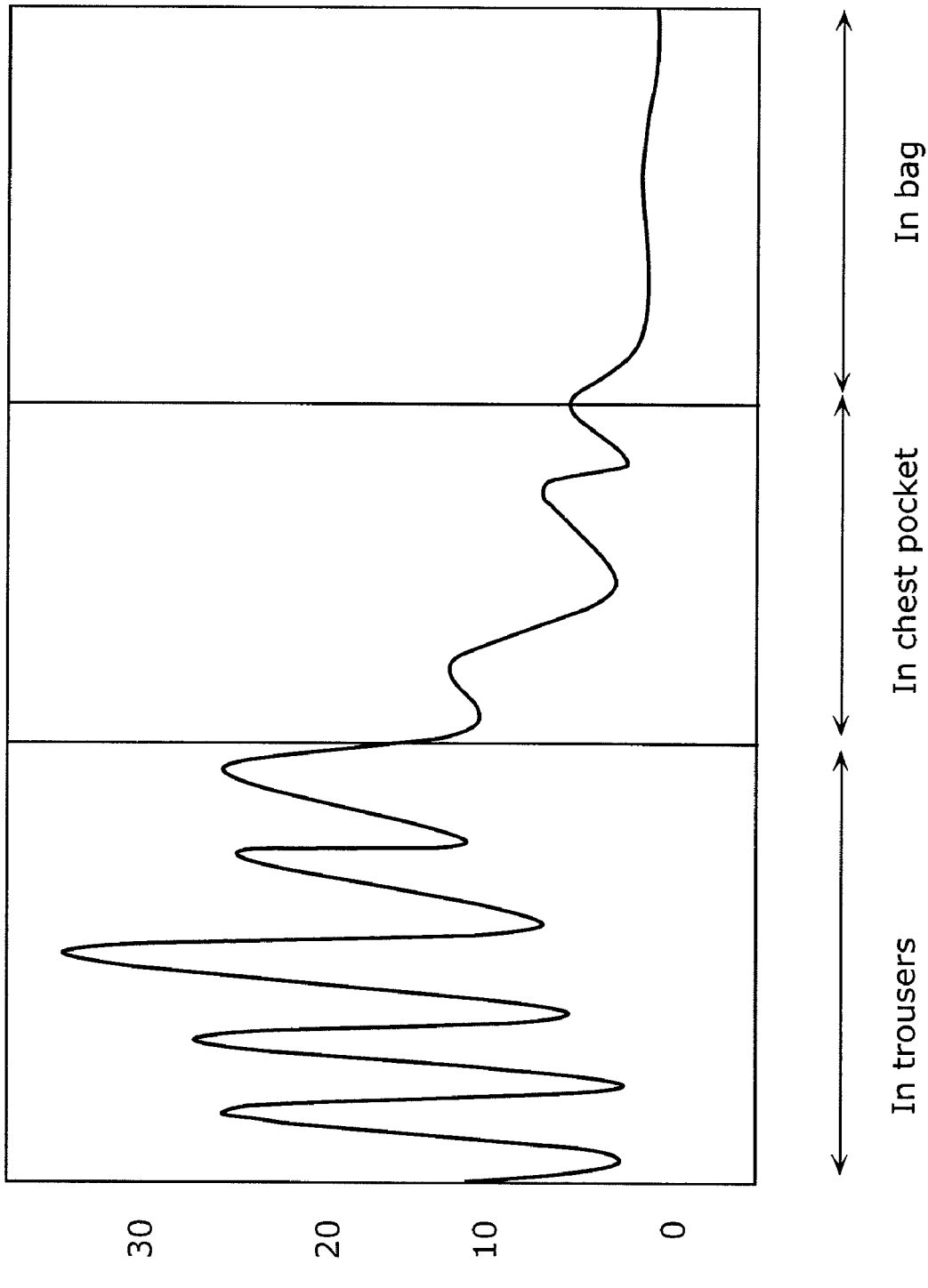
FIG. 21 is a diagram showing an example of a display screen of the system disclosed in the Non Patent Literature 1.

FIG. 20 is a diagram showing a displacement in the z-axis direction (temporal change in location) when the user performs an operation near the chest and subsequently houses the mobile device 600 in the trouser pocket. As the figure shows, based on the position at which the user started the operation, the mobile device 600 moves within around 35 cm for a while, that is, in the chest space, and moves to a point −100 cm after the disconnect button is pressed. Since the location of the end point is −100 cm from the reference point (chest), the location identifying unit 106 can identify that the mobile device 600 has moved to the waist space. However, if the sensor unit 102 continues detecting the speed information even after the end point, the error in displacement increases, to indicate that the mobile device 600 is significantly moving despite that fact that the mobile device 600 is in the trouser pocket. In other words, to identify the location of the mobile device 600 in relation to the user, it is important to accurately determine the end point.

Thus, the mobile device 600 according to the present embodiment determines the end point, using the point at which the drift phenomenon starts to be detected. Specifically, as the figure shows, the end point determining unit 106b determines, as the end point, the point at which the temporal change in displacement starts showing a quadratic feature.

Note that in practice, a detection error of the sensor unit 102 is always generated. However, when the user performs some operation such as pressing the button, what is called an error is offset by a large value of the acceleration resulting from this operation. For example, in FIG. 20, even during a period from when the text-messaging operation button is pressed to when the disconnect button is pressed, the detection error by the sensor unit 102 is generated. However, the detection error is offset by a larger value of the acceleration generated by shaking that is caused by the movement of a hand gripping the mobile device 600 or by the user's operation. That is, in FIG. 20, the quadratic change in displacement as shown by the dotted curve does not continue. On the other hand, when the detection of the speed information stops as a result of the mobile device 600 being housed in the waist space, the error is quadratically added, causing what is known as the draft phenomenon. Thus, the end point determining unit 106*b* determines, as the end point, the point at which the quadratic change started to be detected only in the case where the quadratic change continues within a predetermined time (for example, for one second). Here, the end point determining unit 106*b* judges whether or not the quadratic change continues, based on, for example, whether or not the acceleration equal to or above a predetermined threshold is detected. Specifically, when only acceleration below the predetermined threshold is detected, the end point determining unit 106*b* judges that the quadratic change continues. In addition, the end point determining unit 106*b* may calculate the difference between the quadratic change in displacement and the actual change so as to judge that the quadratic change continues, when the calculated difference is continuously below the predetermined threshold for a predetermined time.

In addition, it is possible to assume that the user does not house the mobile device 600 while the user is inputting operation information. Thus, even in the case where the quadratic change continues, the end point determining unit 106*b* does not determine, as the end point, the point at which the quadratic function started to be detected, when the operation input unit 101 receives an input of the operation information.

Thus, it is possible to reduce the influence of the error of the sensor unit 102 by determining the end point of the movement trajectory, using the quadratic change in displacement which results from the error of the sensor unit 102, thereby allowing improved accuracy in identifying the location of the mobile device 600 in relation to the user.

Thus far, the mobile device according to the present invention has been described, but the present invention is not limited to these embodiments. The scope of the present invention also includes a variation of any kind conceived by those skilled in the art and applied to the present embodiments, and any embodiment configured with a combination of constituent elements in different embodiments, without departing from the scope of the present invention.

For example, in the embodiments described above, the relative location of the mobile device has been defined as the "ear space", the "chest space", and the "waist space", but these reference spaces are not limited to the segmentation as this. For example, the reference space may be segmented according to sections such as a visible space in which the user can see the screen of the mobile device and an invisible space in which the user cannot see the screen. The user normally performs a button operation such as inputting a text message at a position that allows the user to see the screen of the mobile device. Thus, when the user enters an input into the mobile device via the button, the user performs the operation in a region where the screen of the mobile device is visible. On the other hand, the "ear space" or the like shown in FIG. 4 is a space in which the screen of the mobile device is not visible to the user. Thus, the user performs different operations on the mobile device in the space where the user can see the screen of the mobile device and in the space where the user cannot see the screen.

In addition, in the above embodiments, the location identifying unit has identified the location of the mobile device in relation to the user, using the information on the movement trajectory from the operation reference point to the reference space, but it is also possible to consider a variation as described below.

According to the present variation, for example, by reversely tracking the trajectory leading to the operation reference point, it is possible to find where the mobile device has been located until then.

Hereinafter, an example where the mobile device is housed in the chest pocket will be specifically described. Note that it is assumed that, at first, that the mobile device is housed in the chest pocket is not known yet. Then, when this mobile device housed in the chest pocket receives an incoming call, the user is assumed to move this mobile device to the ear to start a call.

The trajectory calculating unit calculates a trajectory of the mobile device since the mobile device receives the incoming call. Then, the reference point determining unit determines that the point at which the user answers the call is the ear (reference point).

The trajectory from when the mobile device receives the incoming call to when the user starts to talk can be calculated using acceleration and so on as in the embodiments described above. In the case of the incoming call, since it can be considered that the user never fails to call near the ear, the location identifying unit can determine, as the location of the end point of the trajectory, the position at which the user took out the mobile device, by reversely tracking the trajectory starting from the ear (reference point) as the start point.

With this, the mobile device is identified as having been housed in the chest pocket before receiving the incoming call. The location thus identified as where the mobile device has been housed is referred to as an original housing location.

By using the original housing location thus identified by reversely tracking the trajectory, it is possible to subsequently identify the location in which the mobile device has been housed, in case of failing to locate the housing location of the mobile device according to the method shown in the first embodiment and so on described above.

In other words, even in the case where the location in which the mobile device has been housed cannot be identified based on the next trajectory from the reference point at which the user performed some operation and so on or in the case where the accuracy of the identified location is low, it is possible to subsequently identify the location in which the mobile device has been housed, using the reference point based on the operation that is to be performed next and so on.

Hereinafter, as another example, the case of performing text-messaging operation and then housing the mobile device in the chest pocket will be considered.

In the case of text-messaging operation and so on, as shown earlier, the user does not necessarily perform the operation at a definite point in space. As a result, the location identifying unit cannot always identify the housing location of the mobile device with accuracy, only by identifying the location of the mobile device based on the reference point (the chest, for example) and the next trajectory.

In contrast, by reversely tracing the trajectory as shown in the above method when the user answers an incoming call that is received after a while, the location identifying unit can identify that the original housing location is the chest pocket.

In addition, even in the case where the mobile device has already been identified as being housed in the chest pocket based on the text-messaging operation and so on, it is possible to improve the reliability of the accuracy in location identification when the chest pocket is determined as the original housing location based on the subsequent receiving of an incoming call.

With this, for example, in the case of holding the history of the housing location of the mobile device, it is possible to accurately hold history of the housing location of the mobile device. The history, thus collected, of the housing location in which the user houses the mobile device can be used for creating a user profile and so on.

Note that identifying the original housing location by reversely tracking the trajectory from receiving the incoming call to answering the call has a feature of higher accuracy in location identification. This is because, generally, when receiving the incoming call, the user often takes out the cellular phone immediately and starts a call action immediately for the reason that the subsequent operation is only to press the call button or the like. In other words, this is because a noise or an error is unlikely to be generated in the trajectory for reasons that the time from receiving the incoming call to calling is comparatively short and that the user need not perform some other operation in the middle. In addition, this is also because the call is generally performed at the ear, and thus an error in the reference point, which is caused by differences between users and situations, is small.

Thus, the mobile device can use the original housing location of the mobile device identified by the method described above in order to identify whether or not the housing location identified by the method shown in the first embodiment and so on is correct or not. Furthermore, the mobile device can complement accuracy of the housing location by using the subsequently identified original housing location in case of failing to identify the housing location according to the method shown in the first embodiment and so on.

Note that the present invention can be realized as a mobile device location identifying apparatus which includes an operation input obtaining unit and a sensor information obtaining unit, instead of including the operation input unit and the sensor unit that are included in the mobile device according to the embodiments described above. If this is the case, the operation input obtaining unit and the sensor information obtaining unit included in the mobile device location identifying apparatus obtain operation information and speed information from the operation input unit and the sensor unit included in the mobile device. Then, the mobile device location identifying apparatus can identify the location of the mobile device in relation to the user as in the case of the mobile device according to the present embodiments, using the obtained operation information and speed information.

Furthermore, the present invention can be realized as the device location identification method for performing the processing that is performed by such a characteristic constituent element of the mobile device, and also as a program for causing a computer to execute the method. In addition, such a program can be distributed via a transmission medium, such as a recording medium such as a CD-ROM, and a transmission medium such as the Internet.

INDUSTRIAL APPLICABILITY

The present invention can be used as a mobile device which can identify a location of a mobile device in relation to a user, and can particularly be used as a mobile device which switches an operation mode of the mobile device or recognizes an action of the user using the identified location, for example, as a cellular phone, a PDA, and a digital still camera.

REFERENCE SIGNS LIST 100, 200, 300, 400, 500, 600 Mobile device
101 Operation input unit
102 Sensor unit
103 Reference point rule holding unit
104 Reference point determining unit
105 Trajectory calculating unit
106 Location identifying unit
106a Error characteristics detecting unit
106b End point determining unit
107 Sensor information holding unit
108 Action pattern rule holding unit
109 Action judging unit
110 Mode switching unit
111 Mode holding unit
112 Operation position history holding unit
113 Operation position history registering unit

The invention claimed is:

1. A mobile device which identifies a location of said mobile device in relation to a user, said mobile device comprising:
an operation input unit configured to receive an input of operation information entered by the user;
a sensor unit configured to detect speed information regarding said mobile device;
a reference point rule holding unit configured to hold reference point rules each of which indicates a relationship between the operation information and a reference point which indicates the location of said mobile device at a point in time when the input of the operation information is received;
a reference point determining unit configured to determine, as an operation reference point, the reference point corresponding to the operation information received by said operation input unit, with reference to the reference point rules;
a trajectory calculating unit configured to calculate a movement trajectory of said mobile device, based on the speed information detected by said sensor unit; and
a location identifying unit configured to identify a location of an end point of the movement trajectory originating at a start point that is a point corresponding to the operation reference point, using the movement trajectory calculated by said trajectory calculating unit.

2. The mobile device according to claim 1, further comprising:
an operation position history holding unit configured to hold position information regarding the operation reference point; and
an operation position history registering unit configured to register, on said operation position history holding unit, the position of the end point as position information regarding a second operation reference point, when assuming a first operation reference point to be the start point and the second operation reference point to be the end point, the first operation reference point and the second operation reference point being determined by said reference point determining unit using the movement trajectory calculated by said trajectory calculating unit,
wherein said location identifying unit is configured to identify the position of the end point, based on the position information regarding the second operation reference point held in said operation position history holding unit.

3. The mobile device according to claim 1,
wherein said location identifying unit further includes:
an error characteristics detecting unit configured to detect characteristics of the movement trajectory, the characteristics resulting from an error in the speed information detected by said sensor unit; and an end point determining unit configured to determine the end point of the movement trajectory according to the detected characteristics of the movement trajectory.

4. The mobile device according to claim 3,
wherein said sensor unit is configured to detect at least acceleration as the speed information,
said error characteristics detecting unit is configured to detect a quadratic change in the location of said mobile device, the quadratic change resulting from an error in the acceleration detected by said sensor unit, and
said end point determining unit is configured to determine, as the end point, a point at which the quadratic change starts to be detected by said error characteristics detecting unit.

5. The mobile device according to claim 4,
wherein said end point determining unit is configured to determine the end point based on whether or not said operation input unit has received the input of the operation information and whether or not the quadratic change continues within a predetermined time after the quadratic change starts to be detected.

6. The mobile device according to claim 5,
wherein said end point determining unit is configured to judge whether or not said operation input unit has received the input of the operation information and whether or not the quadratic change continues within the predetermined time after the quadratic change starts to be detected, and (i) to determine, as the end point, a point at which the quadratic change starts to be detected, when judging that said operation input unit has not received the input of the operation information and that the quadratic change continues, and (ii) not to determine, as the end point, the point at which the quadratic change starts to be detected, when judging that said operation input unit has received the input of the operation information or that the quadratic change does not continue.

7. The mobile device according to claim 1,
wherein said reference point rule holding unit is configured to hold the reference point rules including a reference point rule which associates operation information regarding determining of a function of said mobile device with a chest reference point indicating a front of the user's chest, and a reference point rule which associates operation information regarding text messaging with the chest reference point, and
said reference point determining unit is configured to determine the chest reference point as the operation reference point in the case where operation information newly received by said operation input unit is the operation information regarding the determining of the function of said mobile device and is the operation information regarding text messaging.

8. The mobile device according to claim 1,
wherein said reference point rule holding unit is configured to hold the reference point rules including a reference point rule which associates an audio signal that is a type of the operation information with an ear reference point indicating a side of the user's ear, and
said reference point determining unit is configured to determine the ear reference point as the operation reference point, in the case where operation information newly received by said operation input unit is the audio signal.

9. The mobile device according to claim 1, further comprising:
a mode holding unit configured to hold a mode rule indicating a relationship between the position of the end point identified by said location identifying unit and a mode indicating a setting for a function and an operation of said mobile device; and
a mode switching unit configured to switch the mode, with reference to the mode rule, to a mode corresponding to the position of the end point identified by said location identifying unit.

10. The mobile device according to claim 1,
wherein, in the case where said operation input unit has newly received a plurality of operation information pieces and where the plurality of operation information pieces include a predetermined piece of operation information, said reference point determining unit is configured to determine, as the operation reference point, a reference point corresponding to the predetermined piece of operation information.

11. The mobile device according to claim 10,
wherein the predetermined piece of operation information is an audio signal resulting from a call.

12. The mobile device according to claim 1,
wherein said sensor unit is configured to start detecting the speed information when said operation input unit receives the input of the operation information.

13. The mobile device according to claim 1,
wherein said location identifying unit is configured to identify the position of the end point of the movement trajectory calculated by said trajectory calculating unit, by reversely tracking the movement trajectory.

14. The mobile device according to claim 13,
wherein the operation information is an audio signal resulting from a call, and
said location identifying unit is configured to identify the position of the end point at a time of receiving the call corresponding to the audio signal resulting from the call.

15. A mobile device location identifying method for identifying a location of a mobile device in relation to a user, used in the mobile device including an operation input unit which receives an input of operation information entered by the user and a sensor unit which detects speed information regarding the mobile device, said mobile device location identifying method comprising:
determining, as an operation reference point, a reference point corresponding to the operation information received by the operation input unit with reference to reference point rules each of which indicates a relationship between the operation information and the reference point which indicates the location of the mobile device at a point in time when the input of the operation information is received;
calculating a movement trajectory of the mobile terminal, based on the speed information detected by the sensor unit; and
identifying a location of an end point of the movement trajectory originating at a start point that is a point corresponding to the operation reference point, using the movement trajectory calculated in said calculating.

16. A non-transitory computer-readable medium having a program stored thereon for identifying a location of a mobile device in relation to a user, in the mobile device including an operation input unit which receives an input of operation information entered by the user and a sensor unit which detects speed information regarding the mobile device, the program causing a computer to execute:

determining, as an operation reference point, a reference point corresponding to the operation information received by the operation input unit with reference to reference point rules each of which indicates a relationship between the operation information and a reference point which indicates the location of the mobile device at a point when the input of the operation information is received;

calculating a movement trajectory of the mobile terminal, based on the speed information detected by the sensor unit; and identifying a location of an end point of the movement trajectory originating at a start point that is a point corresponding to the operation reference point, using the movement trajectory calculated in the calculating.

* * * * *